(12) United States Patent
Qiao et al.

(10) Patent No.: US 11,110,682 B2
(45) Date of Patent: Sep. 7, 2021

(54) SOLID-GAP MULTILAYERS FOR THERMAL INSULATION AND MANAGEMENT

(71) Applicant: The Regents of the University of California, Oakland, CA (US)

(72) Inventors: Yu Qiao, San Diego, CA (US); Ying Zhong, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/300,492

(22) PCT Filed: May 15, 2017

(86) PCT No.: PCT/US2017/032670
§ 371 (c)(1),
(2) Date: Nov. 9, 2018

(87) PCT Pub. No.: WO2017/197391
PCT Pub. Date: Nov. 16, 2017

(65) Prior Publication Data
US 2019/0283360 A1    Sep. 19, 2019

Related U.S. Application Data

(60) Provisional application No. 62/463,154, filed on Feb. 24, 2017, provisional application No. 62/336,373, filed on May 13, 2016.

(51) Int. Cl.
*B32B 25/10* (2006.01)
*B32B 25/20* (2006.01)
(Continued)

(52) U.S. Cl.
CPC .............. *B32B 3/08* (2013.01); *B32B 3/10* (2013.01); *B32B 7/02* (2013.01); *B32B 7/05* (2019.01);
(Continued)

(58) Field of Classification Search
CPC .. B32B 3/10; B32B 3/08; B32B 23/08; B32B 23/42; B32B 23/046; B32B 23/20; B32B 27/283; B32B 27/34; B32B 27/322; B32B 27/32; B32B 27/308; B32B 27/40; B32B 27/304; B32B 27/281; B32B 27/302; B32B 27/36; B32B 27/365; B32B 27/306; B32B 27/288; B32B 27/12; B32B 9/043;
(Continued)

(56) References Cited

U.S. PATENT DOCUMENTS 5,284,692 A * 2/1994 Bell ...................... B32B 7/02
428/69
6,428,882 B1 * 8/2002 Peiffer .................. B32B 27/36
428/220
(Continued)

OTHER PUBLICATIONS

Demeuse, Mark T., ed. Biaxial stretching of film: Principles and applications. Elsevier, 2011. (Year: 2011).*
(Continued)

*Primary Examiner* — Michael Zhang
(74) *Attorney, Agent, or Firm* — Fish & Richardson P.C.

(57) ABSTRACT

A multilayer structure comprising solid layers and defining at least one gap that separates the solid layers to form an alternating pattern of the solid layers and the at least one gap in the structure.

14 Claims, 20 Drawing Sheets

(51) Int. Cl.

| | |
|---|---|
| *B32B 27/12* | (2006.01) |
| *B32B 25/08* | (2006.01) |
| *B32B 15/088* | (2006.01) |
| *B32B 15/06* | (2006.01) |
| *B32B 7/02* | (2019.01) |
| *B32B 15/082* | (2006.01) |
| *B32B 15/14* | (2006.01) |
| *B32B 17/10* | (2006.01) |
| *B32B 3/08* | (2006.01) |
| *B32B 7/05* | (2019.01) |
| *B32B 3/10* | (2006.01) |
| *B32B 37/18* | (2006.01) |
| *B32B 23/08* | (2006.01) |
| *B32B 27/28* | (2006.01) |
| *B32B 27/34* | (2006.01) |
| *B32B 9/04* | (2006.01) |
| *B32B 9/00* | (2006.01) |
| *B32B 23/04* | (2006.01) |
| *B32B 27/32* | (2006.01) |
| *B32B 15/085* | (2006.01) |
| *B32B 27/30* | (2006.01) |
| *B32B 27/40* | (2006.01) |
| *B32B 27/36* | (2006.01) |
| *B32B 15/095* | (2006.01) |
| *B32B 25/16* | (2006.01) |
| *B32B 23/20* | (2006.01) |
| *B32B 25/18* | (2006.01) |
| *B32B 15/09* | (2006.01) |

(52) U.S. Cl.
CPC .............. *B32B 9/005* (2013.01); *B32B 9/007* (2013.01); *B32B 9/041* (2013.01); *B32B 9/043* (2013.01); *B32B 9/045* (2013.01); *B32B 9/047* (2013.01); *B32B 15/06* (2013.01); *B32B 15/082* (2013.01); *B32B 15/085* (2013.01); *B32B 15/088* (2013.01); *B32B 15/09* (2013.01); *B32B 15/095* (2013.01); *B32B 15/14* (2013.01); *B32B 17/10* (2013.01); *B32B 23/042* (2013.01); *B32B 23/046* (2013.01); *B32B 23/08* (2013.01); *B32B 23/20* (2013.01); *B32B 25/08* (2013.01); *B32B 25/10* (2013.01); *B32B 25/16* (2013.01); *B32B 25/18* (2013.01); *B32B 25/20* (2013.01); *B32B 27/12* (2013.01); *B32B 27/281* (2013.01); *B32B 27/283* (2013.01); *B32B 27/288* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *B32B 37/18* (2013.01); *B32B 2250/02* (2013.01); *B32B 2255/06* (2013.01); *B32B 2255/10* (2013.01); *B32B 2255/20* (2013.01); *B32B 2255/205* (2013.01); *B32B 2255/26* (2013.01); *B32B 2260/021* (2013.01); *B32B 2262/101* (2013.01); *B32B 2262/106* (2013.01); *B32B 2266/122* (2016.11); *B32B 2266/126* (2016.11); *B32B 2307/102* (2013.01); *B32B 2307/206* (2013.01); *B32B 2307/208* (2013.01); *B32B 2307/412* (2013.01); *B32B 2307/414* (2013.01); *B32B 2307/728* (2013.01); *B32B 2307/73* (2013.01); *B32B 2419/00* (2013.01)

(58) Field of Classification Search
CPC ......... B32B 9/005; B32B 9/041; B32B 9/045; B32B 9/007; B32B 9/047; B32B 15/085; B32B 15/095; B32B 15/09; B32B 15/088; B32B 15/06; B32B 15/14; B32B 25/16; B32B 25/18; B32B 25/10; B32B 25/20; B32B 25/08; B32B 25/082; B32B 7/02; B32B 7/05; B32B 17/064; B32B 37/18; B32B 2262/101; B32B 2262/106; B32B 2266/122; B32B 2266/021; B32B 2266/126; B32B 2419/00; B32B 2307/73; B32B 2307/102; B32B 2307/412; B32B 2307/206; B32B 2307/414; B32B 2307/208; B32B 2307/728; B32B 2255/20; B32B 2255/02; B32B 2255/26; B32B 2255/10; B32B 2255/06
See application file for complete search history.

(56) References Cited

U.S. PATENT DOCUMENTS

| | | | |
|---|---|---|---|
| 2001/0023008 A1* | 9/2001 | Offermann | E04B 1/8409 428/119 |
| 2009/0286022 A1* | 11/2009 | Bowers | B65D 81/3823 428/34.1 |
| 2009/0324858 A1* | 12/2009 | Jaeger | E06B 3/6617 428/34 |
| 2010/0071100 A1 | 3/2010 | Faris | |
| 2010/0146886 A1 | 6/2010 | Zhu et al. | |
| 2011/0079011 A1* | 4/2011 | Sabo | E06B 3/6608 60/641.15 |
| 2011/0080090 A1 | 4/2011 | Wood et al. | |
| 2012/0188215 A1 | 7/2012 | Bushankuchu | |
| 2014/0272277 A1 | 9/2014 | Schaedler et al. | |
| 2015/0176266 A1* | 6/2015 | Duforestel | E04B 1/80 165/136 |
| 2017/0183869 A1* | 6/2017 | Berger | B32B 3/18 |

OTHER PUBLICATIONS

PCT International Preliminary Report on Patentability in Appln. No. PCT/2017/032670, dated Nov. 13, 2018, 7 pages.
PCT International Search Report and Written Opinion in Appln. No. PCT/US2017/032670, dated Aug. 3, 2017, 9 pages.

* cited by examiner

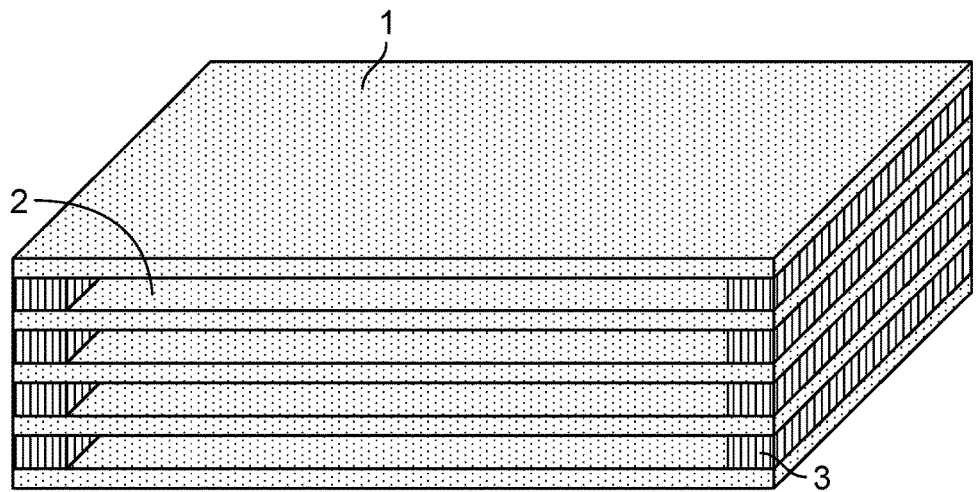
FIG. 1
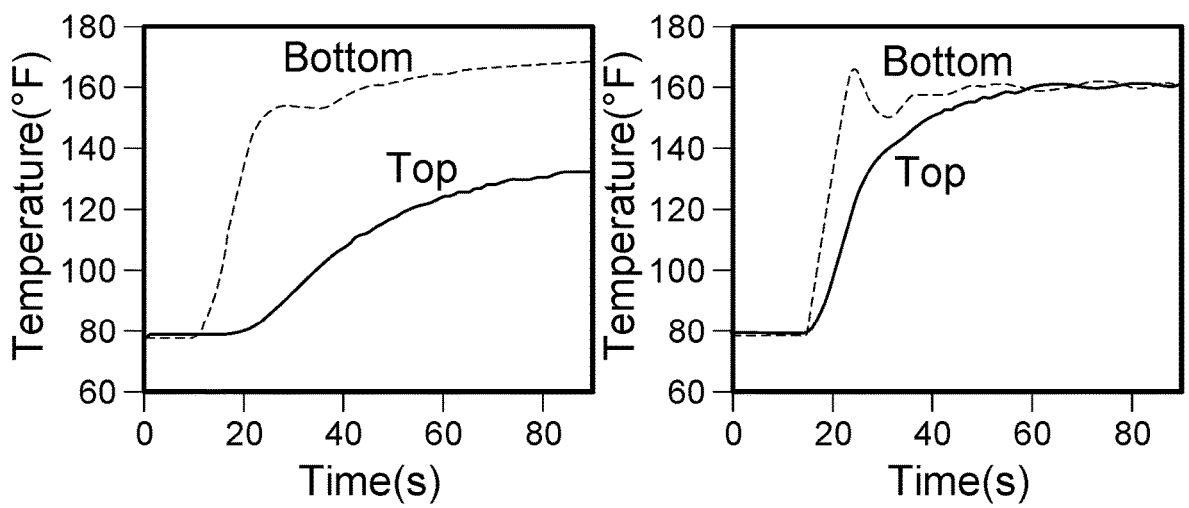
FIG. 2
FIG. 3A
FIG. 3B

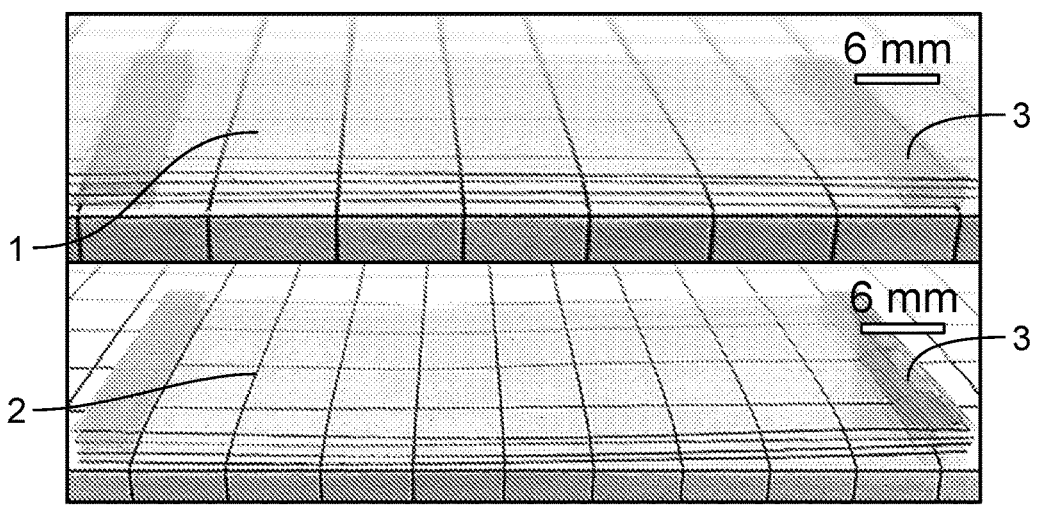
FIG. 15
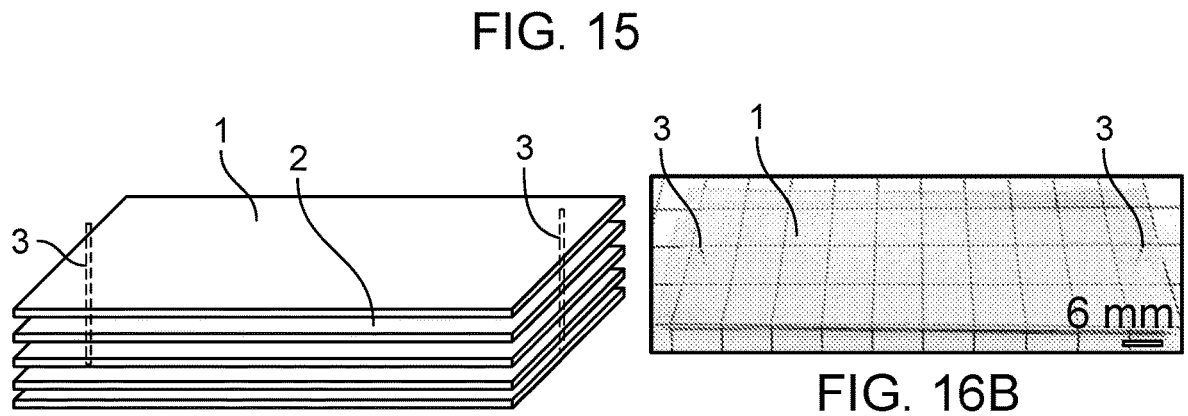
FIG. 16A
FIG. 16B
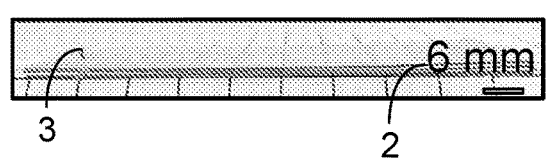
FIG. 16C
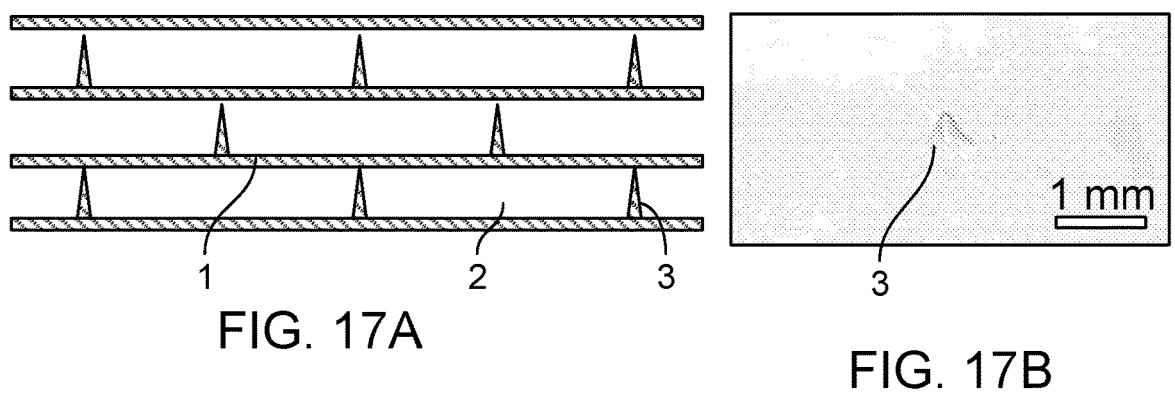
FIG. 17A
FIG. 17B

SOLID-GAP MULTILAYERS FOR THERMAL INSULATION AND MANAGEMENT

CROSS-REFERENCE TO RELATED APPLICATIONS

This application is a 371 U.S. National Phase Application of PCT/US2017/032670, filed on May 15, 2017, which claims benefit of priority from U.S. Provisional Application No. 62/463,154, filed Feb. 24, 2017, and U.S. Provisional Application No. 62/336,373, filed on May 13, 2016.

STATEMENT AS TO FEDERALLY SPONSORED RESEARCH

This invention was made with government support under DE-AR0000737 awarded by the Department of Energy. The government has certain rights in the invention.

TECHNICAL FIELD

The present document relates to multilayered structures that can be used as, for example, insulating materials.

BACKGROUND

Thermal and acoustic insulation materials and structures (TAIMS) are of immense importance to a large number of commercial, industrial, military, and aerospace applications. One possible approach to engineer an insulating material is to exploit the large thermal resistance of interfaces in a solid multilayer. However, due to the inherently high thermal conductivity of solids, the conductivity of the most advanced solid multilayers to date generally is around 0.1-0.2 W/m·K.

Most high-performance TAIMS contain cavities, and are in the form of, for example, foams and honeycombs. Among these, the thermal conductivity of silica aerogels and polymer nanofoams can be as low as ~0.012 W/m·K, thanks to the high porosity and the size effects. A major limitation of cavity-containing TAIMS, however, is the low structural integrity that is associated with their large porosity and/or their relatively high density of defects.

SUMMARY

This document relates to multilayer insulation structures that are resilient and structurally robust, with useful insulating capabilities. In particular, the multilayer insulation structures described herein are solid-gap multilayer (SGM) structures, which are structures containing at least two solid layers that are separated by one or more gaps or spacings.

The SGM structures described herein typically contain cavities that are "two-dimensional," such that the solid layers within the SGM structures are separated into a number of discrete sections. The "two-dimensional" cavities typically have a large width and length, but small thickness, such that the thickness typically is at least 5 times smaller than the width and the length. Such cavities can provide a significant advantage by efficiently utilizing empty space within the structure to suppress heat transfer. In contrast, when the cavities in a TAIMS are "zero-dimensional" (e.g., cells) or "one-dimensional" (e.g., pores or channels), thermal or acoustic energy can be conducted through the solid ligaments or connections, which reduces efficiency of the insulation. It is noted that the length, width, and thickness of a "zero-dimensional" cavity are very similar to each other (e.g., differ by less than 100%) and are all very small (e.g., smaller than 1 mm), while the width and thickness of a "one-dimensional" cavity are similar (e.g., differ by less than 100%) but the length is much larger (e.g., at least 5 times larger).

In a first aspect, this document features a multilayer structure having two or more solid layers, where each solid layer is separated from an adjacent solid layer by a gap, such that the multilayer structure has an alternating pattern of solid layers and gaps, and where the multilayer structure is adapted for thermal insulation, acoustic insulation, thermal management, acoustic management, or combinations thereof.

In another aspect, this document features a multilayer structure having two or more solid layers, where each solid layer is separated from an adjacent solid layer by a gap, such that the multilayer structure has an alternating pattern of solid layers and gaps, and where the solid layers are electrified, magnetized, or electrified and magnetized. The multilayer structure can have a non-uniform electric field distribution or a non-uniform magnetic field distribution. One or both sides of the two or more solid layers can be covered by a magnetically neutral layer, an electrically neutral layer, or a partly neutral layer. The neutral or partly neutral layers can be uniform, heterogeneous, anisotropic, or a combination thereof.

In another aspect, this document features a multilayer structure having two or more solid layers, where each solid layer is separated from an adjacent solid layer by a gap, such that the multilayer structure has an alternating pattern of solid layers and gaps, and where the solid layers comprise a low-emissivity material. The two or more solid layers can have a coating containing a low-emissivity material. The low-emissivity material can include one or more polymers, ceramics, elastomers, glasses, semiconductors, or conductors. For example, the low-emissivity material can include one or more of poly(ethylene terephthalate) (PET), aluminum, zinc oxide, titanium oxide, tin oxide, indium oxide, indium tin oxide, zirconium oxide, or another oxide.

In another aspect, this document features a multilayer structure having two or more solid layers, where each solid layer is separated from an adjacent solid layer by a gap, such that the multilayer structure has an alternating pattern of solid layers and gaps, and where the two or more solid layers are pre-stressed. At least one of the two or more solid layers can be pre-stressed to a different magnitude than an adjacent solid layer. At least one of the two or more solid layers can be pre-stressed in a different direction than an adjacent solid layer.

In yet another aspect, this document features a multilayer structure having two or more solid layers, where each solid layer is separated from an adjacent solid layer by a gap, such that the multilayer structure has an alternating pattern of solid layers and gaps, and where the multilayer structure is adapted such that an inner pressure within one or more of the gaps is adjustable, or the thickness of one or more of the gaps is adjustable.

The following features apply to any of the embodiments described herein.

At least one of the solid layers can be a cover, a substrate, or a divider.

One or more of the gaps can have a thickness of 20 mm or less.

The multilayer structure can further include one or more discontinuous components within one or more of the gaps, wherein the discontinuous components provide support for the two or more solid layers, and wherein the one or more discontinuous components comprise a fiber, a tube, a pillar, a particle, a block, a tape, a band, a fiber bundle, a particle cluster, a pillar array, or a combination thereof. The one or more discontinuous components within a gap can have a total area that is less than 10%, less than 1%, less than 0.1%, or less than 0.01% of the area of a solid layer defining a side of the gap.

The two or more solid layers can be adapted to have anti-contact-electrification properties or reduced contact electrification effects.

The thicknesses of the two or more solid layers and the at least one gap can be 1 µm or less.

At least two of the two or more solid layers can be made of different materials.

The solid layers can be transparent or translucent.

At least one of the two or more solid layers, or at least one gap, can have a non-uniform individual thickness.

The thickness of the at least one solid layer or the at least one gap can be non-uniform along a surface of the multilayer structure.

The two or more solid layers can include a metal, a metal alloy, a polymer, an elastomer, a carbon material, a ceramic, glass, a composite material, or a combination or components thereof.

At least one of the two or more solid layers can be nonplanar. At least two adjacent solid layers can have a curvature that is substantially the same.

At least one of the two or more solid layers can be affixed to a self-tightening frame.

The gaps can be filled with at least one gas, or several different types of gases.

The two or more solid layers can include soundproof components.

The solid layers are can be hydrophobic or hydrophilic.

The edges of at least one of the two or more solid layers can be bent or curved. The edges of two or more of the solid layers can be joined together, and/or can be anchored to a substrate.

The multilayer structure can be contained within a frame. The frame can determine the boundary condition of the multilayer.

The multilayer structure can be adapted for use as heat exchanger, or adapted for enhancement of thermal insulation of buildings, windows, or other structures.

The gaps can contain a heating or cooling medium that enhances the heat exchange rate of the multilayer structure. Different gaps can contain different heating and cooling media.

In another aspect, this document features a method for making a multilayer structure having two or more solid layers, where each solid layer is separated from its adjacent solid layer or layers by a gap, such that the multilayer structure has an alternating pattern of solid layers and gaps. The method can include stacking solid layers together. The method can further include folding or unfolding one or more of the solid layers, forming a plurality of solid layers and removing select solid layers, bending or curving an edge of at least one of the solid layers, joining the edges of two or more of the solid layers, anchoring an edge of at least one of the solid layers to a substrate, and/or treating or processing the two or more solid layers to have an anti-contact-electrification characteristic or a reduced contact electrification effect.

In addition, this document features the use of a multilayer structure as described herein in thermal insulation, acoustic insulation, thermal management, acoustic management, or combinations thereof.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a schematic illustration of an exemplary SGM as provided herein. 10, SGM; 20, solid layer; 30, gap; 40, spacer.

FIG. 2 is a series of images of exemplary electrified and non-electrified SGM samples before, during, and after finger compression.

FIGS. 3A and 3B are graphs plotting the temperature profile of an exemplary electrified (FIG. 3A) and non-electrified (FIG. 3B) SGMs, after compression.

FIG. 4A: 1, glass slide; 2, polyvinyl formal solution; FIG. 4B: 3, filter; FIG. 4C: 4, nanofilm; 5, blade; FIG. 4D: 6, water; FIG. 4E: 7, flowing nanofilm; 8, o-ring; FIG. 4F: 9, free-standing nanofilm; 10, larger o-ring; 11, smaller o-ring.

FIG. 5A is an image of an example nanofilm supported by a white o-ring, placed on a logo. FIG. 5B is an image of an example nanofilm held at the opening of a beaker, supporting about 2.5 g aqueous solution of 1 wt. % $CuCl_2$.

FIG. 15 is an illustration of exemplary SGM samples constructed by dipole-only films (top) and free-charge-only films (bottom). 1, charged dipole-only PC film (127 μm) with voltage of +1 kV/−1 kV, which builds up a SGM structure of +1 kV/−1 kV air−1 kV/+1 kV air+1 kV/−1 kV air−1 kV/+1 kV; 2, PET film (50 μm) with free charges and voltage of −1 kV; 3, neutral spacer (400 μm).

FIGS. 16A-16C show an exemplary SGM stabilized by micropillars, as shown by a schematic illustration (FIG. 16A), and top (FIG. 16B) and side (FIG. 16C) views of a photo image. 1, PC film (127 μm); 2, gap; 3, pillar.

FIGS. 17A-17C show an exemplary SGM supported by bumps, as shown by a schematic illustration (FIG. 17A), a magnified image of a needle-shaped bump made by thermoforming (FIG. 17B), and an image of a four-layer SGM supported by needle-shaped bumps (FIG. 17C). 1, film; 2, gap; 3, bump.

DETAILED DESCRIPTION

Figure 4A:
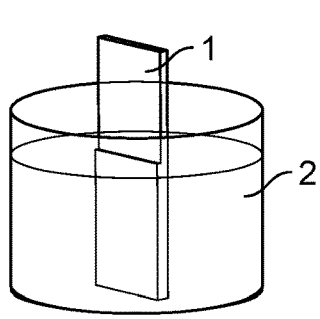
FIGS. 4A-4F are a series of illustrations showing an exemplary dip-coating procedure for manufacturing and stacking free-standing polyvinyl formal (formvar) nanofilms.
Figure 4B:
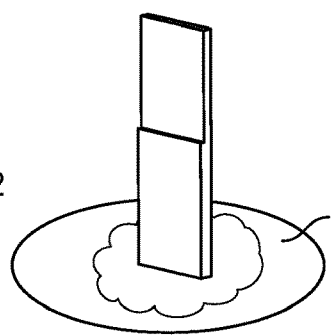
Figure 4C:
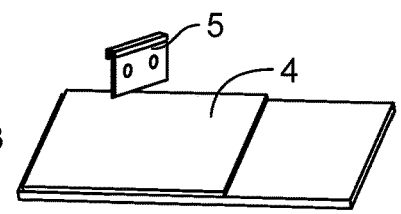

FIG. 1 provides a schematic illustration of an exemplary SGM structure 10 as provided herein. The SGM structure 10 has many possible thermal and acoustic insulation applications, such as commercial, industrial, military, and aerospace applications. For example, an SGM can be place onto, adjacent to, or within a window, wall, roof, floor, door, or other structure. As shown in FIG. 1, the structure 10 includes solid layers 20, where each layer 20 has as first surface and a second surface, and is separated from adjacent layers by a gap 30. In general, the SGM structure 10 can have two or more solid layers 20 and can define one or more gaps 30, such that the SGM has "n" solid layers and "n−1" gaps.

The SGM structure of FIG. 1 also includes support structures 40 (also referred to as "spacers"), disposed between the solid layers 20 for providing structural support to each layer 20. The support structures 40 also serve to define the gaps 30 between the layers 20. Each gap 30 has a predetermined gap distance controlled by the height of its corresponding spacer 40. In some cases, all of the layers 20 in the SGM structure 10 are separated from an adjacent layer 20 by a gap 30 (as shown in FIG. 1). In some cases, only some of the layers 20 in the structure 10 are separated from an adjacent layer 20 by a gap 30. The SGM structures described herein can be used for thermal or acoustic insulation, or thermal or acoustic management.

As mentioned above, the SGM structure contains cavities that are two-dimensional. A SGM structure can be formed by separating a number of solid layers with the gaps. In some cases, the gaps can be stabilized through electrification or surface modification of the solid layers. Because the adjacent solid layers neither adhere to each other nor repel each other, the SGM can be resilient and robust. The solid layer count in the SGM structure described herein can range from 2 to more than 10,000 (e.g., 2 to 10, 10 to 20, 20 to 50, 50 to 100, 100 to 1,000, 1,000 to 5,000, 5,000 to 10,000, or more than 10,000).

The solid layers of the SGM structures provided herein can be made of elastomers, thermosets, thermoplastics, natural polymers, ceramics, glass, metallic materials, alloys, carbon materials, composite materials, or combinations thereof. Suitable examples of materials that can be used to form SGM solid layers include, without limitation, polyurethane, polyisoprene, polybutadiene, polypropylene, polystyrene, polyethylene, polycarbonate, poly(methyl methacrylate), polydimethylsiloxane, polyethylene terephthalate, polyvinyl chloride, acrylonitrile butadiene styrene, acetal, polychlorotrifluoroethylene, polyamide-imide, poly-chlorotrifluoroethylene, chlorinated polyvinyl chloride, cellulose, cellulose acetate butyrate, fluorinated ethylene propylene, polybutylene terephthalate, polyether ether ketone, polyether ketone ketone, polyethylenimine, polyethylene terephthalate, perfluoroalkoxy alkane, ethylene-vinyl acetate, styrene acrylonitrile, polyimide, polyamide, polyaramid, kevlar, teflon, polysulfone, poly(phenylene oxide), polyphenylene sulfide, polyphenylsulfone, polyvinylidene fluoride, polytetrafluoroethylene, fluoro-polymers, paper, wood, cement, concrete, soil, sand, clay, glass, fabrics, alumina, copper and copper alloys, aluminum and aluminum alloys, nickel and nickel alloys, steel, surfactants, carbon paper, carbon matrix composites, glass fiber composites, carbon fiber composites, carbon nanotubes, smart materials that materials that can be responsive to temperature and/or voltage changes, shape-memory polymers, shape-memory alloys, titanium-nickel alloys, hydrogels, aerogels, piezoelectric materials, thermoelectric materials, graphite, and activated carbon, or any combination of the aforementioned materials. In some cases, the SGM structures provided herein can include solid layers without apertures, or solid layers that define cavities or apertures in their surfaces (e.g., porous, foam, or honeycomb "non-solid" solid layers).

In some cases, the solid layer in a SGM can include multiple components. For instance, each solid layer can be made of one or more composite materials. Exemplary composite materials that can be used in the solid layers include, without limitation, nanocomposites, nanoporous materials, aerogels, fiber-reinforced composites, particulate-reinforced composites, laminates, jointed sheets, separated sheets, bilayers, multilayers, platelet-reinforced composites, polymer-matrix composites, carbon-matrix composites, metallic-matrix composites, ceramic-matrix composites, or combinations thereof. In some cases, for example, a solid layer can include one or more composite materials such as a polymer-clay nanocomposite, polymer-carbon nanotube nanocomposite, polymer-nanoparticle composite, polymer-nanofiber composite, glass fiber reinforced composite, carbon fiber reinforced composite, metal multilayer, metal-polymer multilayer, or any combination thereof.

The stiffness, strength, toughness, or fatigue resistance of the solid layers can be adjusted by using one or more reinforcement components. For example, the solid layers can be reinforced, stiffened, strengthened, or toughened by including particles, beads, fibers, tubes, threads, rods, fabrics, layers, mats, grids, networks, or blocks of materials such as glass, ceramics, carbon materials, polymers, elastomers, composites, metals, alloys, carbon materials, or any combination thereof. Suitable examples of reinforcements include, without limitation, glass fibers, carbon fibers, long fibers having a length-to-diameter ratio larger than or equal to ten, short fibers having a length-to-diameter ratio smaller than ten, ceramic particles, nanoparticles, nanotubes, glass particles, polymer fibers, metal fibers, and any combination thereof. The SGM structures provided herein can define gaps containing a fluid, such as a gas or liquid. In some cases, gaps can be filled by air or another gas (e.g., argon), a fluid, or a combination thereof of gas and fluid. In some cases, the gaps 30 can contain a liquid, such as water or an aqueous solution. In some cases, the gaps can be in a vacuum or can contain a pressurized gas. Thus, the inner pressure within the gaps can range from vacuum pressure to atmospheric pressure, or greater than atmospheric pressure. In some cases, the contents (e.g., gas and/or fluid) and/or the pressures in the gaps can be different for different gaps.

In some cases, the solid layer thickness, gap thickness, and/or solid layer materials of the SGM structures provided herein can be varied from one layer to another. For example, the layer thickness or the gap thickness of the SGM structure can be increased or decreased along a length or width of the SGM structure. The properties of the SGM structure can be adjusted by controlling and modifying the thickness of the gaps and solid layers. In some cases, the thickness of one or more of the gaps in a SGM can be adjustable (e.g., between zero and the full thickness permitted by the solid layers and support structures of the structure). The gap thickness also can be reversibly adjustable, such that an increased thickness can be decreased to its original size, and a decreased thickness can be increased to its original size. Examples of methods and components for controlling gap thickness are described in the Examples herein (see, e.g., Example 16).

The solid layers of the SGM structures provided herein can be optionally electrified. In some cases, the electrification of one or more solid layers can be achieved using a technique such as, without limitation, corona charging, thermal charging, space charging, grafting, adsorption, absorption, blending, mixing, or embedding of charged components, heat charging, glow discharging, plasma treating, or combinations thereof. Other types of electrification techniques may be contemplated by one skilled in the art to achieve solid layer electrification.

In some cases, at least a portion of one or both surfaces of a solid layer within a SGM structure can include a mask material. For example, in some cases, a stainless steel mask may be disposed on a film surface (e.g., a PET film surface). In some cases, the SGM structures provided herein can have one or more masked layers that can be electrified to produce surface charge densities that are different in the exposed areas as compared to the masked areas of the structure. By controlling the parameters of the charging process, the charges on the solid film surface may be either uniform or non-uniform. In various embodiments, the mask can be made of one or more polymers, metals or alloys, ceramics, glasses, carbon materials, natural materials, elastomers, and combinations thereof. The size, thickness, texture, and pattern of a mask can be varied to achieve a desired charge distribution in the structure. Examples of materials suitable for forming masks include, without limitation, polyurethane, polyisoprene, polybutadiene, polypropylene, polystyrene, polyethylene, polycarbonate, poly(methyl methacrylate), polydimethylsiloxane, polyethylene terephthalate, polyvinyl chloride, acrylonitrile butadiene styrene, acetal, polychlorotrifluoroethylene, polyamide-imide, poly-chlorotrifluoroethylene, chlorinated polyvinyl chloride, cellulose, cellulose acetate butyrate, fluorinated ethylene propylene, polybutylene terephthalate, polyether ether ketone, polyether ketone ketone, polyethylenimine, polyethylene terephthalate, perfluoroalkoxy alkane, ethylene-vinyl acetate, styrene acrylonitrile, polyimide, polyamide, polyaramid, kevlar, teflon, polysulfone, poly(phenylene oxide), polyphenylene sulfide, polyphenylsulfone, polyvinylidene fluoride, polytetrafluoroethylene, fluoro-polymers, paper, cement, soil, sand, clay, concrete, wood, glass, fabrics, alumina, copper and copper alloys, aluminum and aluminum alloys, nickel and nickel alloys, steel, surfactants, carbon paper, carbon matrix composites, glass fiber composites, carbon fiber composites, carbon nanotubes, piezoelectric materials, thermoelectric materials, graphite, and activated carbon, or any combination of the aforementioned materials.

One or more solid layers of a SGM structure can be optionally magnetized. In some cases, the magnetization of one or more solid layers can be achieved using a technique such as, without limitation, embedding, grafting, blending, mixing, attaching, adhering, adsorption of, or absorption of magnetized components, or using a combination of such techniques. Other types of magnetization techniques may be contemplated by one skilled in the art to achieve solid layer magnetization.

In some cases, a SGM structure can include magnetized/electrified solid layers that are covered by one or more neutral films, e.g., on one side or both sides of each solid layer. The neutral films can be made of a material that is magnetically neutral, electrically neutral, or both. Exemplary neutral films include, for example, transparent tapes (e.g., 3M™-600 transparent SCOTCH® tapes).

In some cases, distribution of electric and/or magnetic field in the solid layers can be non-uniform along layer surfaces (in a planar direction) and/or along layer thickness directions (in a transverse direction). The intensities and distributions of electrification and/or magnetization can be different in different solid layers. In some cases, the distribution of electric and/or magnetic field can be dotted, stripped, curved, straight, circular, star-shaped, mesh-like, oval, rectangle, square, hexagonal, irregular, or combinations thereof, or in any other shapes.

In some cases, a SGM structure can include one or more discontinuous components (also referred to as support structures or spacers), which can stabilize the gaps and/or solid layers of the SGM structure. In some cases, each gap or solid layer within the structure can be stabilized by one or more discontinuous components. For example, one or more discontinuous components can reside within an area between two solid layers (e.g., a discontinuous component can be sandwiched between two adjacent solid layers). In some cases, a gap between two adjacent solid layers can include up to 50 discontinuous components (e.g., one, two, three, four, five, 10, 20, 30, 40, 50, one to five, five to 10, 10 to 25, or 25 to 50 discontinuous components).

The discontinuous components can have various suitable sizes, shapes, and textures. In some cases, the shape and size of the discontinuous component(s) of a SGM structure can define the shape and size of the gaps within the SGM. For example, the discontinuous component(s) can be sized and shaped such that the remaining area between the solid layers [the area not occupied by the discontinuous component(s)] defines an area of the gap. In some embodiments, the discontinuous components can be sized to a desirable scale that includes, but is not limited to, macroscopic, microscopic, or nanometer-scale dimensions. For example, in some cases, the layer thickness or the gap thickness of the SGM structure can range in a nanometer (nm) scale (e.g., less than 1 μm, 100 nm or less, 10 nm or less, 5 nm or less, or 1 nm or less).

The shapes of the discontinuous components can be, for example, round, straight, curved, circular, sharp, regular, or irregular. The discontinuous components can define, without limitation, bars, strips, threads, fibers, meshes, networks, pillars, rods, dots, particles, tubes, hollow beads, platelets, blocks, hollow pieces, porous grains, porous layers, porous lines, porous parts, or any combination thereof. In some embodiments, each discontinuous component can have a surface characteristic or texture that includes, but is not limited to, porous lines, porous layers, knurled surface, and combinations thereof.

The discontinuous components can be made from metallic materials, alloys, ceramics, glass, polymers, elastomers, carbon materials, or combinations thereof. The discontinuous components can be made of the same materials as the solid layers, or from different materials. For example, a discontinuous component can be made from a material such as, without limitation, polyurethane, polyisoprene, polybutadiene, polypropylene, polystyrene, polyethylene, polycarbonate, poly(methyl methacrylate), polydimethylsiloxane, polyethylene terephthalate, polyvinyl chloride, acrylonitrile butadiene styrene, acetal, polychlorotrifluoroethylene, polyamide-imide, poly-chlorotrifluoroethylene, chlorinated polyvinyl chloride, cellulose, cellulose acetate butyrate, fluorinated ethylene propylene, polybutylene terephthalate, polyether ether ketone, polyether ketone ketone, polyethylenimine, polyethylene terephthalate, perfluoroalkoxy alkane, ethylene-vinyl acetate, styrene acrylonitrile, polyimide, polyamide, polyaramid, kevlar, teflon, polysulfone, poly(phenylene oxide), polyphenylene sulfide, polyphenylsulfone, polyvinylidene fluoride, soil, sand, clay, polytetrafluoroethylene, fluoro-polymers, paper, wood, glass, fabrics, alumina, cement, concrete, copper and copper alloys, aluminum and aluminum alloys, nickel and nickel alloys, steel, surfactants, carbon paper, carbon nanotubes, graphite, activated carbon, smart materials, shape-memory polymers, shape-memory alloys, titanium-nickel alloys, hydrogels, aerogels, carbon matrix composites, glass fiber composites, piezoelectric materials, thermoelectric materials, carbon fiber composites, or any combination thereof. In some cases, discontinuous components can be transparent, translucent, or opaque.

The discontinuous components can distribute non-uniformly or uniformly, heterogeneously or homogeneously in the gaps, either along surfaces or through thickness. For example, discontinuous components can form aggregates such that their distribution and orientation can change along the thickness of a SGM or along the surface of one or more solid layers. The discontinuous components can be part of the solid layers (e.g., as protruding, indented, or concave sections), can be integrated or attached to the solid layers, or can be separate from the solid layers. The discontinuous components can be produced through additive manufacturing, such as using adhesives, jointing, heating, pressing, etc., or extraction methods, such as lithography, etching, solving, heating, machining, etc.

In some embodiments, the SGM structures provided herein can be covered by another solid layer, or completely or partly enclosed in a container SGM structures as described herein can be used in methods to reduce radiative heat transfer. In some cases, an SGM structure can be used to reduce radiative heat transfer. At each solid layer in a SGM structure, a portion of radiative heat transfer can be absorbed, reflected, emitted, re-emitted, or blocked. Since this effect can be amplified by a relatively large layer count, the SGM structure can be an efficient barrier to radiative transfer of heat and light, particularly in desired wavelength ranges (e.g., in infrared, ultraviolet, or visible ranges), and can effectively have low-emissivity (low-e) characteristics (e.g., with an effective thermal emissivity below 0.6, below 0.3, below 0.2, or below 0.1). The low-e performance of a SGM can be enhanced by using solid layers made from a low-e material (e.g., PET) or having a low-e coating, treatment, and/or additive. Examples of suitable low-e materials and coatings include, without limitation, 3M™ THINSULATE™ films, 3M™ Prestige films, Solar Gard ECOLUX™ films, LEP70 SR CDF EnerLogic films, Stellar Austin films, silver, nickel, oxides, semiconductors, conductors, or any combination thereof.

For example, in a SGM containing two solid layers i and j, if solid layer i has the emissivity of $\varepsilon_i$ and solid layer $\varepsilon_j$ has emissivity of the radiation heat transfer coefficient, U, of the two layers is $$U = 4\sigma T^3 \Big/ \left(\frac{1}{\varepsilon_i} + \frac{1}{\varepsilon_j} - 1\right),$$

where T is the average absolute temperature of the two layers and $\sigma=5.7\times10^{-8}$ W·m$^{-2}$·K$^{-4}$ is the Stefan-Boltzmann constant. For another example, in a SGM having N solid layers, if every solid layer has the same emissivity $\varepsilon$, $$U = 4\sigma T^3 \Big/ \left(N\left(\frac{2}{\varepsilon} - 1\right) + 1\right).$$

Clearly, with more layers, the overall heat transfer coefficient is lower; although the emissivity of each solid layer may be relatively high, the overall emissivity of the SGM can be quite low. For instance, if the emissivity of each solid layer is ~0.54, the overall emissivity of a four-layer SGM can be as low as ~0.1. The low-e performance of SGM can be further enhanced by low-e coatings, low-e treatment, and/or low-e additives of the solid layers.

This document also provides systems and devices that include a multilayer structure as described herein. Thus, a system or device can include a SGM with two or more solid layers, each solid layer being separated from its adjacent solid layer(s) by a gap, such that the SGM structure has an alternating pattern of solid layers and gaps. The SGM may be, for example, disposed within a container, under a cover, or both. Further, the SGM can be placed adjacent to, onto, or within the interior of a device.

Definitions

As used herein, the singular forms, such as "a," "an,", "the", "another", and "the other", include plural referents unless the context clearly dictates otherwise.

As used herein, the terms "about" and "approximately" are used interchangeably, and when used to refer to modify a numerical value, encompass a range of uncertainty of the numerical value of from ½ of the numerical value to twice the numerical value, unless the context clearly dictates otherwise.

As used herein, the description of the processes refers to various efficiency unless the context clearly dictates otherwise. For instance, "transport heat" also means "has a non-zero probability to transport a portion of heat".

As used herein, the calculation of layer count can include optional covers, substrates, and dividers. For example, the outer layer of a SGM attached to a surface (the unattached side) can be referred to as the cover, the bottom layer can be attached to or be a part of the surface or substrate that the SGM is mounted on, and any layer between the outer layer and the bottom layer can be referred to as a divider.

As used herein, a "multilayer" is defined as a structure consisting of two or more than two layers with gaps among them.

As used herein, a "solid" is defined as a matter that can maintain its shape for a non-zero period of time; a "gas" is defined as a matter that can exist in gas phase for a non-zero period of time; a "multilayer" is defined as a structure consisting of more than two solid layers; a "substrate" is defined as the solid material on or in which the multilayer structure is placed; "heat transfer" is defined as transportation of thermal energy from a high-temperature area to a low-temperature area; "thermal management" is defined as adjustment of heat transfer behaviors, including but not limited to increasing or decreasing heat transfer rate, maintaining the temperature in a certain area at a certain time in a certain range or around a certain value, and controlling heat transfer direction; "thermal insulation" is defined as reducing heat transfer over a non-zero period of time.

The invention will be further described in the following examples, which do not limit the scope of the invention described in the claims.

EXAMPLES

Example 1: Electrified Layers

SGM structures were produced and tested using polymer sheets. Four layers of polymer films were stack together. The polymer films were 50 mm long, 20 mm wide, and 100 µm thick, and were supported at the edges by spacers (FIG. 1). The spacers were 20 mm (length)×3 mm (width)×200 µm (thickness) strips of the same polymer. The spacers separated the polymer films from each other, forming gaps between the films.

In one embodiment, the polymer sheets were electrified (polymer sheets were obtained from Pisen Inc.; product name: Clear static cling screen protecting film). In another embodiment, the polymer sheets had the same dimensions but were not electrified; they were obtained from Toray Inc. (LUMIRROR™ polyester film).

As shown in FIG. 2, the SGM containing electrified layers was resilient and robust, while the SGM containing non-electrified layers appeared to collapse after compression without proper treatment. Before the compression test, all the films were flat and evenly separated by gaps. Upon finger compression, both SGM samples were condensed. As the external pressure was removed, the gaps between the electrified films were instantaneously self-restored; the gaps between the non-electrified films, however, did not return, and the layers of film remained stuck together after removal of the external pressure.

After the compression test, the thermal insulation properties of the two SGM were observed. The bottom surface of the SGM sample was heated with a DigiTrol II temperature controller (Aldrich) heated heating tape (FGS0031-010, Omega); the local temperature was monitored by a type-K thermal couple connected to a logger (OM-EL-USB-TC, Omega). The temperature at the upper surface was monitored by another type-K thermal couple. The maximum temperature of the heater was set to 170° F., and the heating rate was set to 4° F./second. For the electrified SGM, as shown in FIG. 3A, at time t=10 seconds, the temperature at the bottom surface increased immediately after the heater was turned on; while the temperature at the upper surface increased gradually and much more slowly. The maximum temperatures at the top and bottom surfaces were 133° F. and 167° F., respectively. The former was lower than the latter by 34° F., indicating that the restored SGM was quite thermally insulating. For the collapsed, non-electrified SGM, the temperatures at the two sides of the samples increased at about the same rate and the maximum temperatures were nearly identical (FIG. 3B), suggesting that the collapsed layer structure was quite thermally conductive.

For a material system, the thermal conductivity can be defined as $\kappa=QL/tAT$, where Q is the heat, L is the distance, t is time, A is the area, and T is the temperature. To increase the temperature of the top side from 80° F. to 100° F., the SGM needs ~15 seconds, while the collapsed SGM needs only ~3 seconds. With other factors being the same, the thermal conductivity is inversely proportional to time. Therefore, the thermal conductivity of the collapsed SGM (~0.18 W/mK for solid polymer) is ~5 times higher than that of SGM in the temperature range of 80° F. to 100° F. That is, the thermal conductivity of the four-layer SGM is ~0.036 W/mK, higher than but comparable with that of air (~0.026 W/mK).

Clearly, when the SGM is condensed, the thermal conductivity is much increased. This characteristic can lead to a "smart" property of a self-restoring SGM—that its thermal conductivity can be controlled repeatedly by adjusting the structural configuration between the condensed state and the restored state.

Example 2: Nanolayers

Figure 4D:
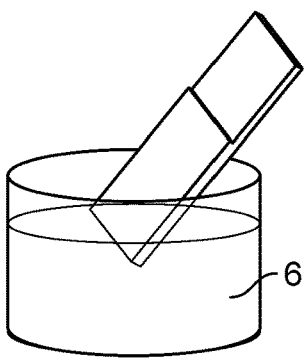
Figure 4E:
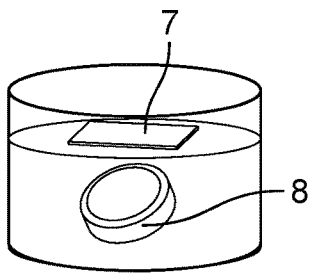
Figure 4F:
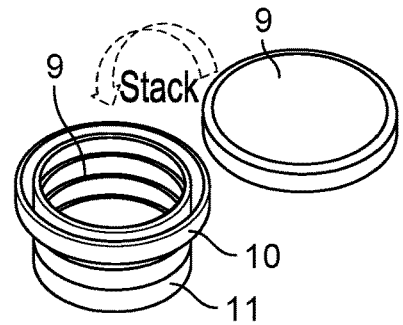
Figure 5A:
FIGS. 5A and 5B are images of an exemplary nanofilm.
Figure 5B:
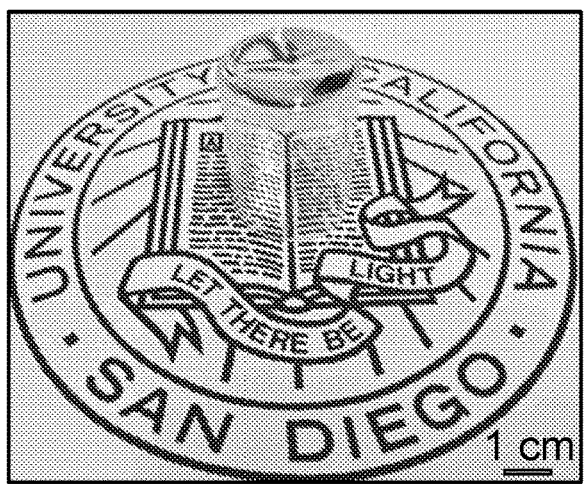

The layer thickness or the gap thickness of a SGM can be on the nanometer (nm) scale, i.e., less than 1 µm. In one embodiment, polyvinyl formal (formvar) nanofilms were produced through dip coating (FIGS. 4A-4F). First, a 0.5 wt. % formvar (Vinylec E Polyvinyl Formal Resin, SPI) solution was prepared, with solvent being chloroform (Sigma). The solution was filtered to remove impurities, and kept in a sealed brown glass container. A glass slide was repeated rinsed with de-ionized water and placed in the formvar solution (FIG. 4A), with a dipping depth of ~3 cm and a dipping time of 2-3 minutes. The glass slide was pulled out of the formvar solution slowly, and rested in a covered container for 2-3 minutes, so that the coated solution dried. The bottom edge of the slide was smeared to remove residual liquids (FIG. 4B), and scraped with a razor blade (FIG. 4C) to remove loose local formvar. The slide was then immersed in a container filled with de-ionized water, with a ~45° tilting angle (FIG. 4D). The formvar film spontaneously separated from the glass slide and floated on the water surface. The nanofilm thickness was ~30 nm. An o-ring (Worksmart) was immersed in the water and used to lift the floating formvar film from beneath, with a lifting angle of −35° (FIG. 4E). The formvar film was dried in air for 10 minutes. To build up the SGM, a smaller o-ring was placed underneath the nanofilm supported by the first, larger o-ring (FIG. 4F). As the larger o-ring was compressed away, the nanofilm was left on the smaller o-ring. Multiple layers can be mounted on the smaller o-ring by repeating this process. FIG. 5A shows the top view of a free-standing formvar nanofilm, held by a white o-ring, placed on a University of California, San Diego (UCSD) logo. The nanofilm was quite transparent. A 30-nm-thick nanofilm, with a diameter of 2.5 cm, could carry a weight of a few grams. FIG. 5B shows that 2.5 g aqueous solution of 1 wt. % copper chloride ($CuCl_2$) was supported by a free-standing nanofilm.

Free-standing formvar nanofilms were electrified by glow discharge. A nanofilm was placed in the sample chamber of a Quorum K950X Evaporator, with a K350 Glow Discharge Unit (GDU). The chamber was pumped to $2\times10^{-1}$ mbar. The GDU current was gradually increased, until the needle on the dial registered ~20 mA. A purple glow inside the K950X chamber could be observed, and was maintained for ~15 seconds to 4 minutes. The nanofilm was negatively charged. By using a Simco Ion Electrostatic Field Meter (FMX-004), the surface voltage of the charged nanofilm was measured to be around −0.12 kV.

The electrified nanofilms repelled each other. When multiple such nanofilms were piled up, gaps were spontaneously generated between them, forming a nano-structured SGM.

Example 3: Charge Distribution in Layer Surface

Figure 6A:
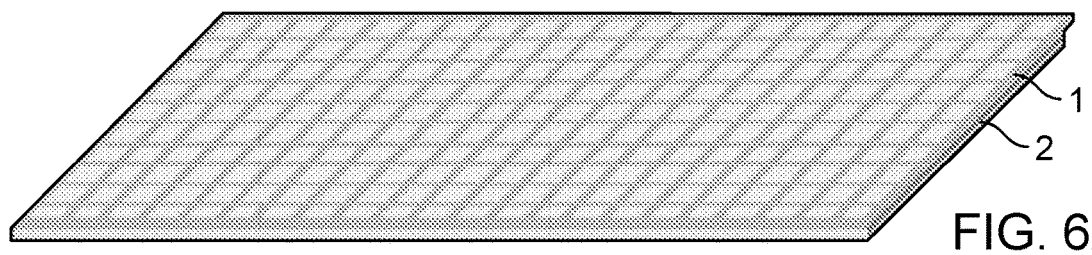
FIGS. 6A and 6B are a schematic illustration (FIG. 6A) and an image (FIG. 6B) of an exemplary masked solid layer. 1, mask; 2, solid layer; 3, PET film; 4, stainless steel mesh.
Figure 6B:
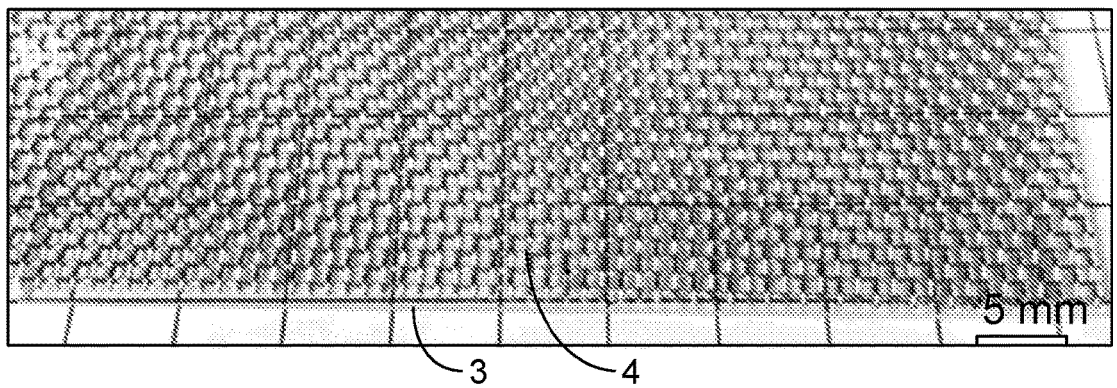

By controlling the parameters of the electrification process, the charges on solid film surface can be either uniform or non-uniform. FIGS. 6A and 6B show one example, in which a stainless-steel mesh mask was placed on top of a 50 mm by 20 mm, 50-µm-thick PET film. The PET film (Product No. 8567K22) and the stainless-steel mesh mask (Product No. 9226T51) were obtained from McMaster-Carr. The mesh size was 20×20; the ligament width was 0.016"; and the opening size was 0.034" with an open area of 46%.

Figure 7:
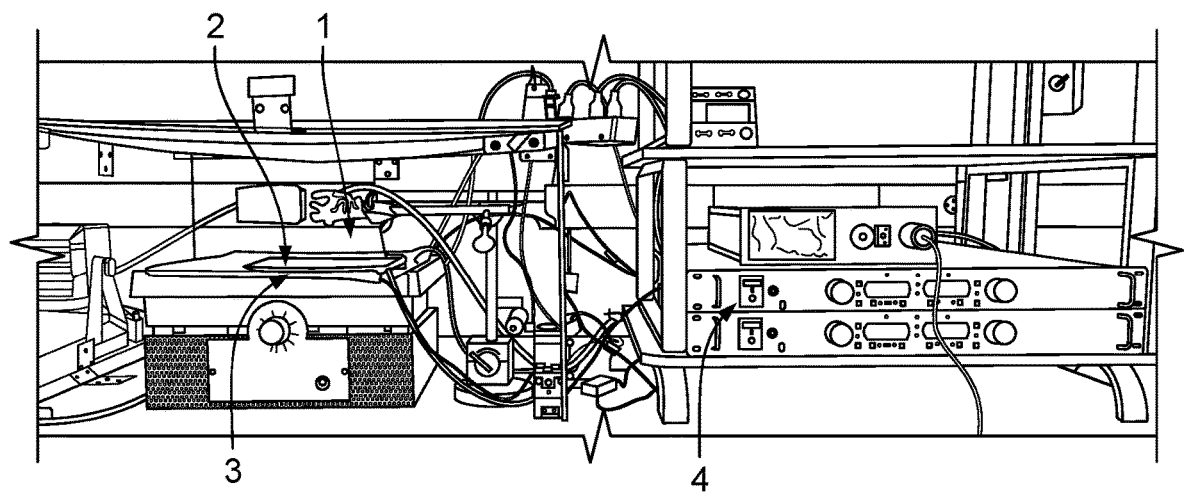
FIG. 7 is an image of an exemplary corona charging system. 1, needle; 2, grid; 3, electrode; 4, high voltage power suppliers.

The mask-PET bilayer was electrified in a corona charging system (CCS) consisting of a high voltage discharging electrode, a wire mesh grid, a ground electrode, and a heating element. As shown in FIG. 7, a sharp tungsten needle was used as the discharge electrode. The needle was 0.75 inch in length and 0.059 inch in diameter; the radius of the tip of the needle was ~100 µm. A grid was placed between the needle and the sample. The grid was made of stainless steel 304 wires, with a wire diameter of 0.016 inch and a mesh size of 20×20. The grid was obtained from McMaster-Carr (Product No. 85385T73). The distance between the needle and the sample was set to 4 cm, and the spacing between the grid and the film was 4 mm. The needle and the grid were held by 3M™ lineless rubber splicing tapes (thru 69 kV). The CCS setup can be adjusted in a broad spectrum according to necessity. The adjustable variables included the needle voltage, the temperature, the heating rate, the cooling rate, the polymer material, the film thickness, the film size, the distance between the needle to the ground electrode, the distance between the needle to the grid, and the environment, among others. Suitable ranges for those parameters can be, for example, 6-30 kV for the needle voltage, 0.1-5 kV for the grid voltage, 2-6 cm for the needle-electrode distance, 2-10 mm for the grid-electrode distance, 0-150° C. for the temperature, and seconds to hours for the charging time. Typical values used were 10 kV needle voltage, 1-2 kV grid voltage, 4 cm needle-electrode distance, 4 mm grid-electrode distance, 60° C. temperature, and 30-60 seconds charging time, although it is noted that any values from the above ranges also are feasible.

The surface charge densities were different in the exposed areas and the masked areas in the PET film. A SGM was constructed by stacking 4 layers of non-uniformly charged PET films. The SGM structure, determined by the film size, the gap thickness, and the spacers, was similar to the samples in Example 1.

A reference SGM was constructed using a similar procedure, with everything else the same except that no steel mask was used during corona charging, so that the electrification effect was uniform along film surface. The thermal insulation properties of both SGMs were similar to that of the SGM based on Pisen films in Example 1.

In general, a mask can be made of one or more polymers, metals or alloys, ceramics, glasses, carbon materials, natural materials, or elastomers described herein, or any combination or components thereof. The size, thickness, texture, and pattern of the charged or non-charged areas can be varied.

Example 4: Variations in Layer Thickness, Gap Thickness, and Layer Materials

Figure 8A:
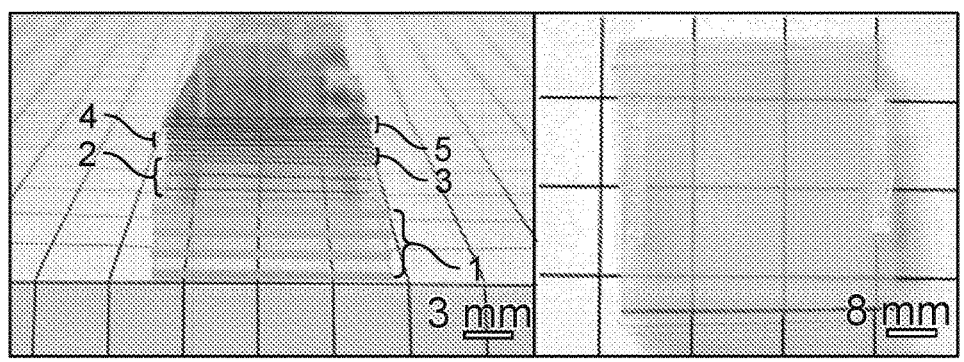
FIGS. 8A and 8B are side and top views, respectively, of an exemplary structure provided herein having a non-uniform through-thickness, non-uniform layer thickness, and non-uniform gap thickness. 1, 1 mm thick glass sheet and 1 mm thick gap; 2, 150 µm thick glass sheet and 0.8 mm thick gap; 3, 100 µm thick PET film and 0.3 mm thick gap; 4, 150 µm glass sheet and 0.2 mm thick gap; 5, 150 µm thick glass sheet and 0.1 mm thick gap.
Figure 8B:
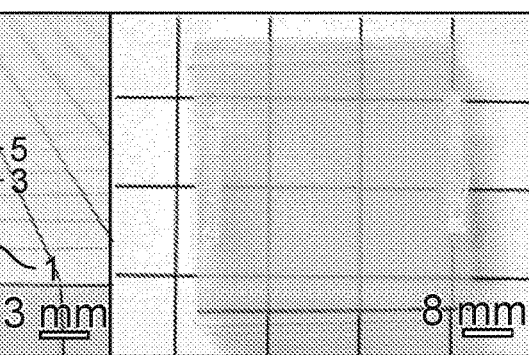

The layer thickness, gap thickness, and layer materials can be different along the thickness direction of a SGM. FIGS. 8A and 8B show an example of a SGM constructed from solid layers with various gap widths, layer thicknesses, and layer materials. From the bottom to the top, the solid layers were respectively: four 1-mm-thick glass sheets, two 150-µm-thick glass sheets, four 100-µm-thick PET films, four 150-µm-thick glass sheets, and three 150-µm-thick glass sheets. The gap widths (thicknesses), from the bottom to the top, varied from 1 mm, 0.8 mm, 0.3 mm, 0.2 mm, to 0.1 mm. The solid layers were separated at their edges by 15-mm-long, 2-mm-wide spacers made of 0.1-mm-thick double-sided tapes, piled together to reach the desired thickness. The thermal conductivity of the SGM sample was similar to that of the SGM based on Pisen films in Example 1.

Example 5: Composite Layers

Each solid layer in a SGM can consist of multiple components. For instance, a solid layer can be made from one or more than one composite materials. Suitable composite materials include, without limitation, foams, honeycombs, nanocomposites, nanoporous materials, aerogels, fiber-reinforced composites, particulate-reinforced composites, laminates, jointed sheets, separated sheets, bilayers, multilayers, platelet-reinforced composites, polymer-matrix composites, carbon-matrix composites, metallic-matrix composites, ceramic-matrix composites, glass-matrix composites, and any combination or components thereof. The material components in a solid layer of a SGM can be polymers, elastomers, carbons, glasses, ceramics, metals, alloys, natural materials, or any combination or component thereof.

Figure 9:
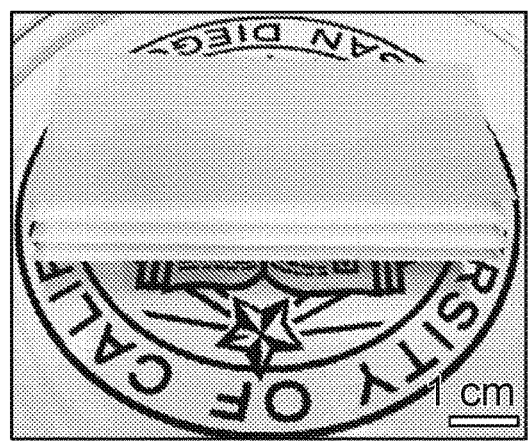
FIG. 9 is an image showing an exemplary SGM made of Emfit composite films.

FIG. 9 shows a four-layer SGM constructed from a composite film obtained from Emfit Ltd. The composite film consisted of a middle porous polyolefin layer (70-80 µm thick) and a transparent layer on each side. The layers were electrified by the manufacturer with a capacitance of 22 pF/cm$^2$. The surface voltage of the film was about +10 kV.

The charged films were stacked together and separated by spacers at the edges, forming a SGM, with the SGM size and structure similar to those of Example 1. The spacers were made of 10 mm long, 3 mm wide stacks of double-sided tapes of the desired thickness. The thermal conductivity of the SGM was similar to that of the SGM based on Pisen films in Example 1.

Example 6: Neutral Cover of Solid Layer

In a SGM, one or more solid layers can cover or be covered by one or more films that are neutral to magnetic fields, electric fields, or both. The neutral films can be on one side or both sides of the solid layer. The coverage can be full or partial, as the neutral film can contain patterns or openings.

Figure 10A:
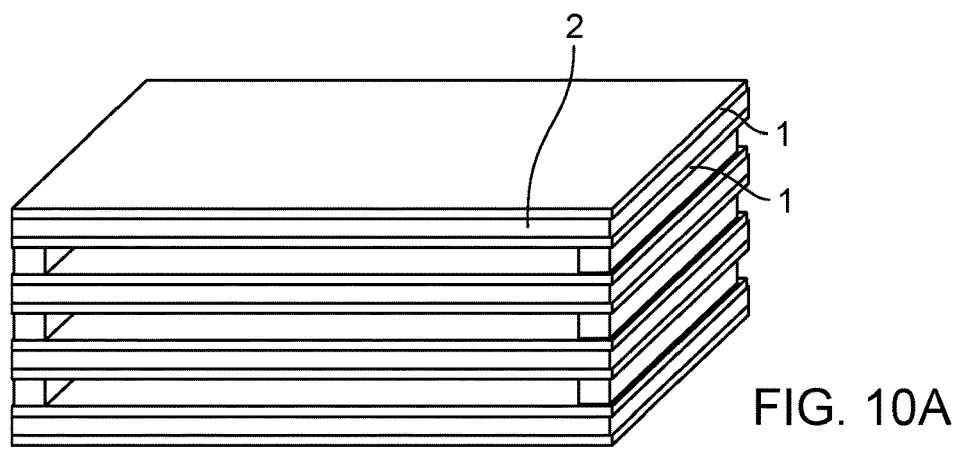
FIGS. 10A and 10B are a schematic illustration (FIG. 10A) and an image (FIG. 10B) of an example SGM formed by solid layers covered by neutral films. 1, neutral film; 2, solid layer.
Figure 10B:
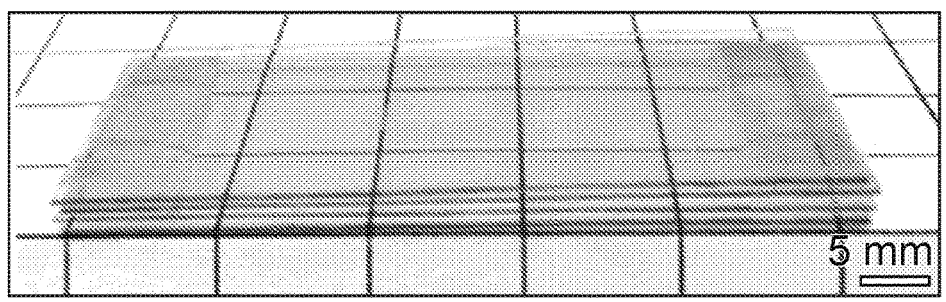

FIG. 10A depicts a SGM structure in which every solid layer is covered a neutral film on both sides. FIG. 10B shows an embodiment in which PET layers were electrified through the same procedure as the reference SGM in Example 3. Each PET layer was covered on both sides by 3M™-600 transparent SCOTCH® tape. The SGM structure was similar to that of the reference SGM in Example 3. The PET layer and spacer materials were the same as those used in Example 3, and the thermal conductivity of the SGM was similar to that of the samples in Example 3.

Example 7: Cover for Solid-Gap Multilayer

Figure 11:
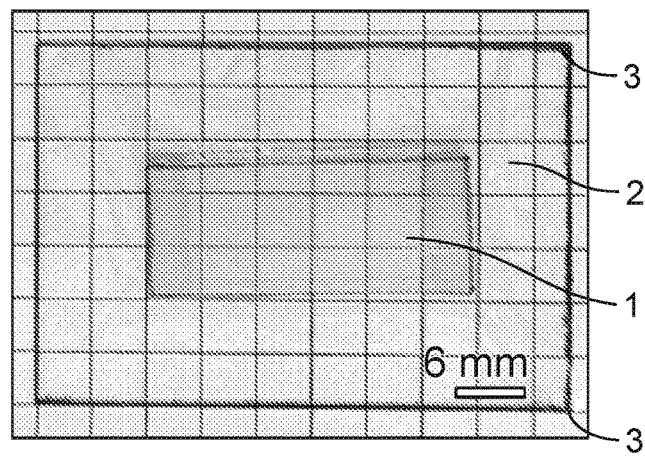
FIG. 11 is an image of an exemplary electrified four-layer SGM with a glass substrate and a PVC film cover. 1, electrified four-layer PET SGM; 2, cover layer; 3, glass substrate.

The SGM scan be covered, enclosed, partly covered, or partly enclosed by a cover or container. FIG. 11 shows a SGM formed from four 50-mm-long, 20-mm-wide PET layers—the same as the layers in the reference sample of Example 3. The SGM was placed on a 10-mm-long, 7.5-mm-wide glass and covered by a 10-mm-long, 7.5-mm-wide, 10-µm-thick Kirkland polyvinyl chloride (PVC) film (Kirkland Signature Stretch-Tite Premium Plastic Food Wrap). The glass plate and the SGM was attached together and sealed at the edges with 3M™ double sided SCOTCH® tapes. The thermal conductivity of the covered SGM was similar to that of the reference sample in Example 3.

Example 8: Multilayers on Single-Pane Substrate or in Double-Pane Structure

Figures 12A, 12B:
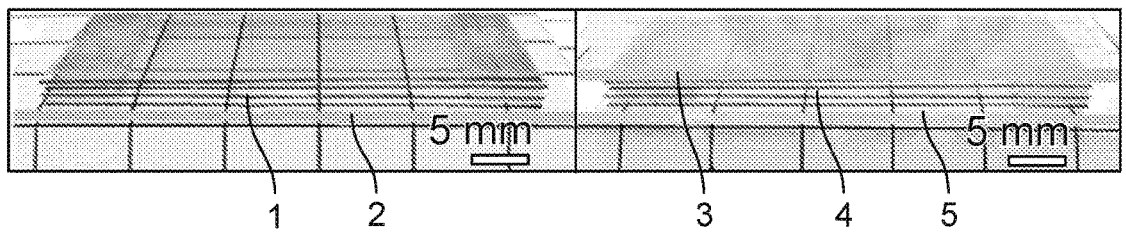
FIGS. 12A and 12B are images of an exemplary electrified four-layer SGM on single-pane glass (FIG. 12A) and in double-pane glass (FIG. 12B). 1, electrified four-layer PET SGM; 2, single-pane glass; 3, top layer of double-pane glass; 4, electrified four-layer PET SGM; 5, bottom layer of double-pane glass.

A SGM can be attached to a single-pane substrate, such as a single-pane window; a SGM also can also be included in a double-pane or multi-pane structure, such as a double-pane window. FIG. 12A shows a SGM formed from 4 PET layers (the same as the reference sample in Example 3), attached to a single-pane glass. FIG. 12B shows the same SGM embedded in a double-pane glass structure. The thermal conductivity of the SGM was similar to that of the reference sample in Example 3.

Figure 13A:
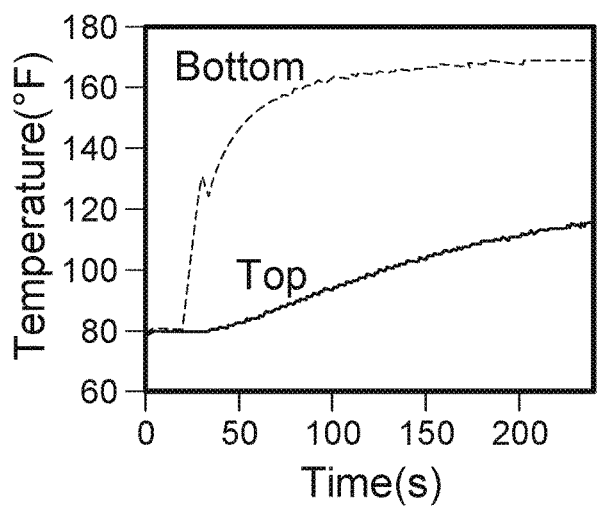
FIGS. 13A and 13B are graphs plotting temperature profiles of exemplary double-pane glass samples with SGM (FIG. 13A) and without SGM (FIG. 13B).
Figure 13B:
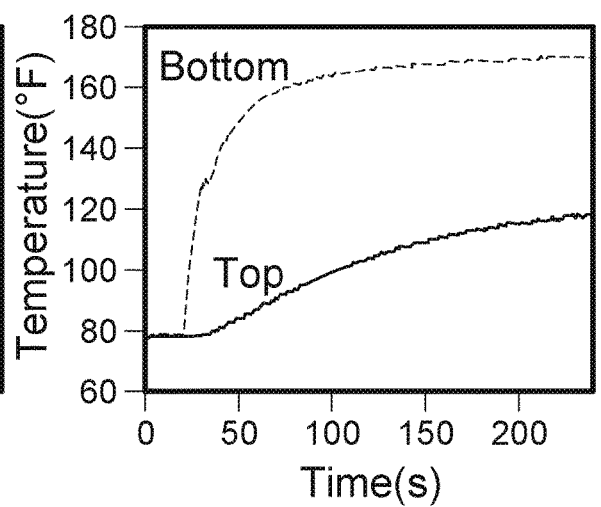

The SGM can significantly enhance the thermal insulation of the single-pane substrate or the double/multi-pane structure. The thermal insulation properties of the double-pane glass structures with and without SGM were measured. The bottom surface of the sample was heated by an OMEGA® FGS0031 heating tape with a SIGMA-ALDRICH® Dig-iTrol II temperature controller; the local temperature was monitored with a type-K thermal couple connected to an OMEGA® OM-EL-USB-TC controller. The temperature at the upper surface was monitored by another type-K thermal couple. The maximum temperature of the heater was set to 170° F., and the heating rate was set to 4° F./second. For both double-pane glass samples, with and without SGM as shown in FIGS. 13A and 13B, respectively, the temperature at the bottom surface increased immediately after the heater was turned on, while the temperature at the upper surface increased gradually. The maximum temperatures of the bottom surfaces of the two samples were both 168° F. The maximum temperature at the upper surface of the sample with SGM was 115° F., lower than that of the sample without SGM. Similar to the analysis in Example 1, the thermal conductivity of the glass-layer structure can be assessed as κ=QL/tAT. To increase the temperature of the top side from 80° F. to 100° F., the double-pane glass structure needed about 95 seconds with the SGM, and only about 60 seconds without the SGM. That is, the SGM reduced the thermal conductivity by about 1.6 times, with the same overall thickness.

Example 9: Corona Charging and Conditioning of Solid Layers

The solid layers in SGM can be electrified. The electrification can be achieved through corona charging, thermal charging, contact electrification, or any combination or variation thereof. The electric field of a solid layer can be uniform or non-uniform. For each solid layer, both sides can be like-charged, or the sides can be oppositely charged. It is noted that the areas of the solid surfaces across a gap in a SGM should be like-charged, so that they tend to repel each other.

Figure 14A:
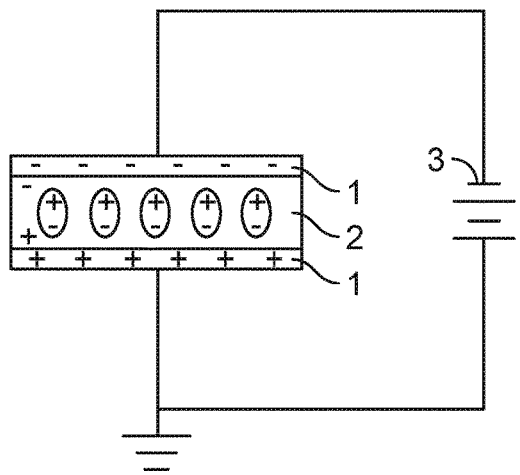
FIGS. 14A and 14B are schematics of a thermal charging system (FIG. 14A) and a triode corona charging system (FIG. 14B). 1, electrode; 2, film; 3, high voltage power supplier; 4, needle; 5, corona; 6, grid.

Suitable electrification methods include, without limitation, thermal/spacing charging (FIG. 14A), corona charging (FIG. 14B), glowing, plasma treatment, radiation treatment, e-beam treatment, and optical treatment, among others. Corona charging typically is fast and cost-efficient. All the processing parameters can be adjusted in wide ranges, including, but not limited to, the ranges discussed below.

Figure 14B:
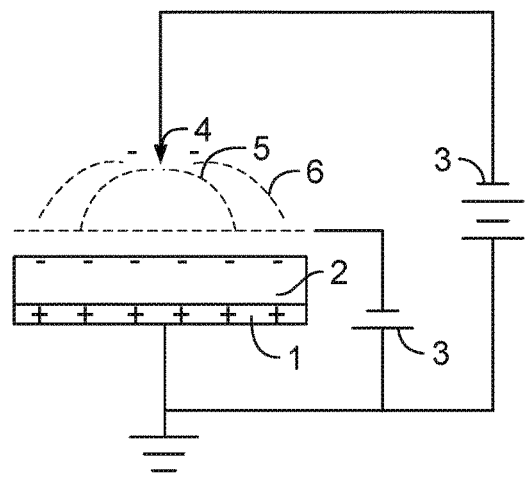

In one embodiment, a corona charging system (CCS) was set up, with a 0.75-inch-long, 0.059-inch-diameter tungsten needle (tip radius ~0.1 mm) connected to a high voltage power supply (Glassman Co. Lt., FJ Series 120 Watt, ±40 kV), being held 20 mm to 60 mm away from a ground electrode. The ground electrode was made of stainless steel, and was placed on a hot plate (Thermo Scientific, 2200 aluminum top hot plate 12×12). The height and the position of the needle could be adjusted by a retort stand. The voltage between the needle and the ground electrode could be controlled in the range from 6 kV to 30 kV. Between the needle and the ground electrode, an optional grid was held by four high-voltage-resistant rubber spacers (made from 3M™ lineless rubber splicing tape for low and high-voltage, thru 69 kV). The grid was made of stainless steel (McMaster-Carr, Product No. 9226T51), about 4 mm away from the ground electrode. The grid was connected to a second high-voltage power supply, with the voltage being controlled in the range from 0.1 kV to 6 kV. A polymer film was placed on the ground electrode (FIG. 14B). The operation temperature was controlled by the hot plate. The temperature could be adjusted in the range from room temperature to 370° C. Numerous materials can be charged by corona charging, including polymers such as PET, fluorinated ethylene propylene (FEP), perfluoroalkoxy alkanes (PFA), polyethylene (PE), poly(methyl methacrylate) (PMMA), polypropylene (PP), polyethylene naphthalate (PEN), polyvinyl chloride (PVC), polycarbonate (PC), polyacrylics, thermoplastics, elastomers, thermosets, natural polymers, etc.; and ceramics such as $Si_2O$, glass, quartz, $Si_3N_4$, etc. All of the above parameters of CCS and the charging procedure can be adjusted in broader ranges, if necessary.

In one embodiment, a corona charging system was used to electrify a 50-μm-thick PET film. The PET film was firmly placed on the ground electrode. The needle voltage, grid voltage, needle-film distance, grid-film distance, temperature, charging duration were 10 kV, 2 kV, 40 mm, 4 mm, 60° C., and 60 seconds, respectively. After corona charging, a voltmeter (Trek, Model 344-3) was used to measure the surface voltage of the electrified PET film while the film was sitting on the ground electrode. The voltmeter reading matched with the grid voltage (2 kV). The film was turned over and the surface voltage of the film on the other side was measured with the front side of the film firmly placed on the ground electrode; the reading was −2 kV. The electrified PET film was then hung in the air and its surface voltage was measured from both sides using a fieldmeter (Simco-ion, FMX-004). The difference between the measurement results for the two sides was about 2 kV. The voltage difference remained constant as long as the two sides were not shorted.

The surface voltage of the electrified PET film was adjustable. In one embodiment, the electrified PET film was rinsed at one side with isopropyl alcohol (IPA). As the IPA was dried in an environment without an electric field, the voltage of the washed side became nearly 0 on the fieldmeter. The surface voltage of the other side changed accordingly, with the voltage difference between the sides being about 2 kV. The rinsing could be performed using any liquid, including but not limited to water, alcohol, organic solvents, inorganic solvents, organic liquids, inorganic liquids, and any combinations or components thereof.

In one embodiment, an IPA-rinsed, charged PET film was dried in an electric field generated by dipping a 5 inch$^2$ FEP film into de-ionized water for 5 seconds and then removing it slowly. No liquid was observed on the film surface, due to the high degree of hydrophobicity. The de-ionized water generated a voltage of −6 kV on the film. By changing the distance between the IPA-rinsed, charged PET film and the charged FEP film, the voltage of the washed side of the PET could be controlled in a broad range.

In one embodiment, an eliminator (Keyence, SJ-F2000) was used to adjust the surface voltage of one side of the charged PET film. Depending on the treatment duration and distance, the surface voltages on both sides of the film could be controlled, with the voltage difference between the two sides remaining constant (~2 kV).

In one embodiment, one side of the charged PET film was touched with a stainless-steel rod (3 inches in length and 0.4 inch in diameter). The surface voltage of the touched side changed, due to contact electrification. The surface voltage of the other side changed accordingly, with the voltage difference between the two sides remaining constant (~2 kV). The contact electrification can be induced by any material, including, without limitation, metals, alloys, ceramics, glass, carbon materials, polymers, elastomers, composites, and any combination or component thereof. The material can be in any shape, including but not limited to bars, rods, particles, blocks, irregular shapes, plates, sheets, tubes, angles, meshes, among others.

In one embodiment, both sides of a PET film were rinsed simultaneously with de-ionized water. After air drying, the surface voltage on both sides of the film was about −1 kV, measured by the fieldmeter. The film did not have dipolar charge components and contained only free charges. The as-received PET film was the same as that in Example 3. FIG. 15 (bottom) shows a four-layer SGM built by 50-μm-thick so-charged PET films. The SGM structure and the thermal conductivity were similar to those of the reference sample in Example 3.

The surface voltage of an electrified solid layer can be adjusted in broad ranges, and can be positive, zero, or negative. The magnitude of the surface voltages on both sides of a solid layer can be equal or different. In a SGM, the solid layers typically are arranged so that across the gaps, the surfaces of adjacent solid layers are like-charged. The two sides of a solid layer can be like-charged or oppositely charged.

Example 10: Discontinuous Components in Gaps

Discontinuous components can be included in the gaps to help stabilize the SGM structure. The discontinuous components can be made of any materials, including but not limited to metals, alloys, polymers, elastomers, glass, ceramics, carbon materials, composite materials, and any combination or component thereof. The discontinuous components can have any shape, including, for example, pillars, rods, pyramids, prisms, ridges, blocks, cubes, plates, layers, layer stacks, tubes, irregular shapes, fibers, and any combination or component thereof. The discontinuous components can be formed from the solid layers, embedded in the solid layers, added onto the solid layers, penetrate through the solid layers, or in a form of any combination or partial component thereof.

In one embodiment, a SGM was constructed using 4 layers of 127-μm-thick, 3×1-inch PC films (FIGS. 16A and 16B). The films were supported by 200-μm-diameter steel fibers stitched across them. The spacing between adjacent steel fibers was 7.5 cm. The bonding between the fibers and the PC films was secured with GORILLA GLUE® S-17186 super glue. The gaps in the SGM were quite stable with the support of the steel fibers. Because the fibers took up only a small fraction of the total SGM area, they did not significantly affect heat transfer across the SGM. The thermal conductivity of the SGM was similar to that of the reference sample in Example 3.

Figure 17C:
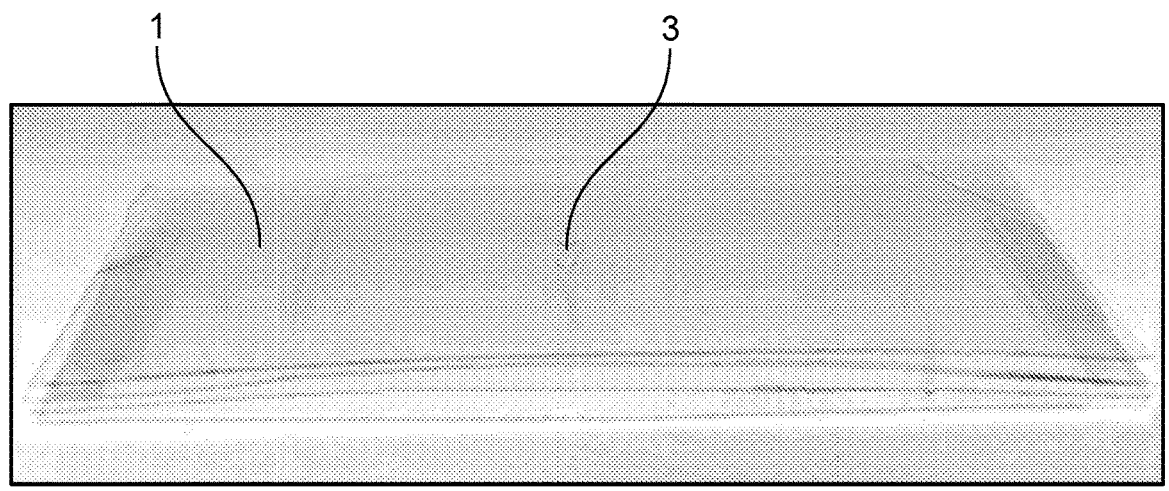

The discontinuous components can be a part of the solid layers. Bumps or any protuberant features on the solid layers can be used to help separate films, as indicated in the schematic shown in FIG. 17A. The discontinuous components of solid layers can be processed through thermoforming, compression molding, extrusion, injection molding, gluing, vacuum forming, blow molding, casting, compression molding, transfer molding, radiation processing, 3D printing, adhesion, and/or joining, for example. FIG. 17B shows one embodiment of a SGM with discontinuous components. A 127-μm-thick PC film was heated using a vacuum-assisted thermoforming machine (KeyStone Pro-line Machine III). On the substrate (connected to a vacuum), a long stainless-steel needle (tip diameter: ~50 μm; body diameter: ~500 μm) was placed vertically to the substrate towards the film. After the film was heated to ~150° C., the vacuum was turned on and the film was forced onto the needle. After the film was cooled, a needle shaped bump was left on the film. FIG. 17C shows that with the support of the discontinuous components, the PC films in the four-layer SGM were stably separated. The thermal conductivity was similar to that of the reference SGM in Example 3.

Example 11: Magnetized Solid Layers

The gaps in a SGM can be stabilized by magnetic forces; the solid layers in a SGM can be fully magnetized or partly magnetized, or can contain magnetic components or additives.

Figure 18A:
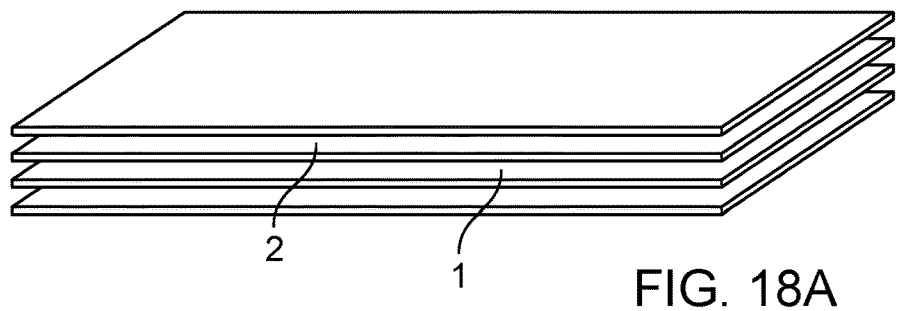
FIGS. 18A and 18B show an exemplary SGM made by magnetized layers, as illustrated by a schematic (FIG. 18A) and an image (FIG. 18B) of a four-layer magnetized SGM (made by barium ferrite modified PDMS films). Arrows indicate the four layers. 1, magnetized layers; 2, gap.
Figure 18B:
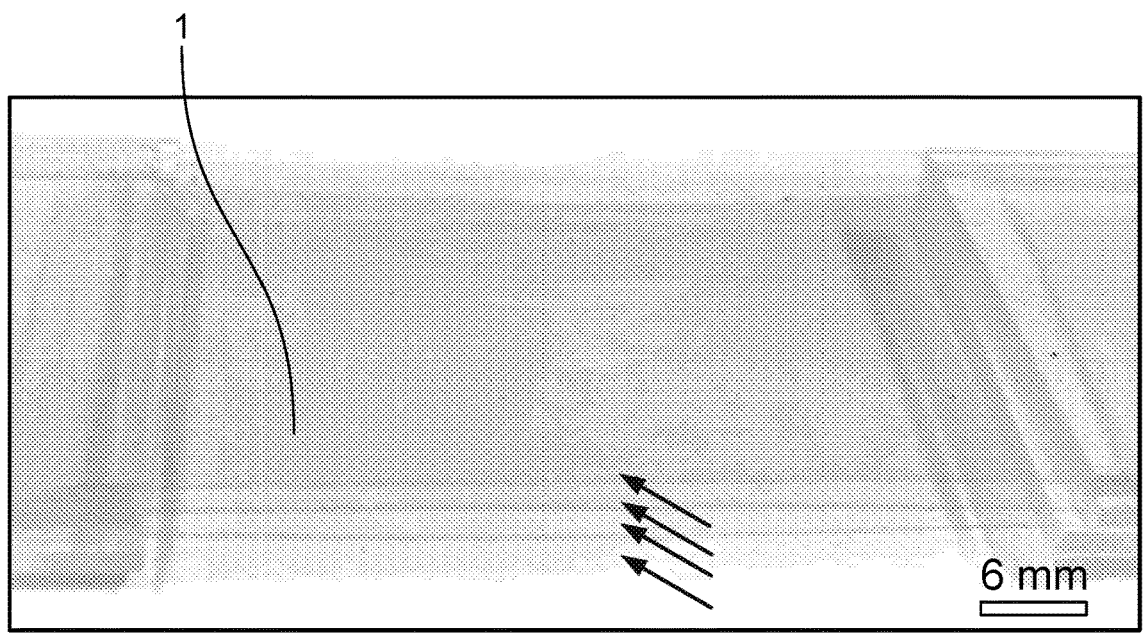

In one embodiment, as shown in FIGS. 18A and 18B, a four-layer SGM was constructed using 3 inch×1 inch×100 μm polydimethylsiloxane (PDMS) films modified with barium ferrite microparticulates. The barium ferrite was obtained from Sigma-Aldrich (Product No. 637602). For each 30 g of PDMS, 10 mg barium ferrite was added. The PDMS films were supported at their edges by 0.03"-thick spacers made of PC strips (McMaster-Carr, 85585K17). The spacer thickness determined the gap thickness. The spacer width was 2 mm. The PDMS films were processed by spin coating. First, 10 g PDMS was mixed with 1 g hardener and 10 mg barium ferrite microparticulates for 3 minutes at 60 rpm. A 3 inch×4 inch×⅛ inch glass slide was cleaned with acetone, IPA, and water, and dried at 100° C. for 10 minutes. The glass slide was then placed into the spin coater, and 2 g of PMMA solution (A2) was dropped onto it. A spin coating was generated at 3000 rpm for 20 seconds. The PMMA coated glass was dried for 1 minute at 100° C. The coated glass slide was placed back into the spin coater, and 2 g of PDMS solution was dropped onto it. Spin coating of PDMS was conducted at 2000 rpm for 20 seconds. The glass was dried at 120° C. for 40 minutes in a constant magnetic field created by a NbFeB magnet (McMaster-Carr, 5862K41). The glass was then immerged in acetone to dissolve the PMMA layer between the PDMS film and the glass, and the PDMS film was removed from the glass substrate. The free-standing PDMS film was repeatedly rinsed in acetone. The magnetized PDMS film was cut into 4 pieces, and used to construct a four-layer SGM. The arrows in FIG. 18B indicate the four PDMS layers. In the SGM, adjacent PDMS films were arranged so that opposite poles of magnetic components in adjacent solid layers faced each other; the repelling force generated by the barium ferrite phase stabilized the gaps between the PDMS films. The spacers of the SGM were similar to those of the reference sample in Example 3. The PDMS films also could be coated by a thin layer of Tween 20 (Sigma-Aldrich, P9416) to mitigate contact electrification. The thermal conductivity of the SGM was similar to that of the reference sample in Example 3.

The magnetic components in a SGM can be in any form, including layers, particles, threads, rods, tubes, fibers, dots, blocks, multilayers, irregular shapes, and any combination or component thereof. The magnetic components can be made of any suitable magnetic material, including, without limitation, metals, alloys, ceramics, glasses, carbon materials, polymers, elastomers, composites, and any combination or component thereof.

Example 12: Solid Layers Reinforced by Stiffening/Strengthening Components

Figure 19A:
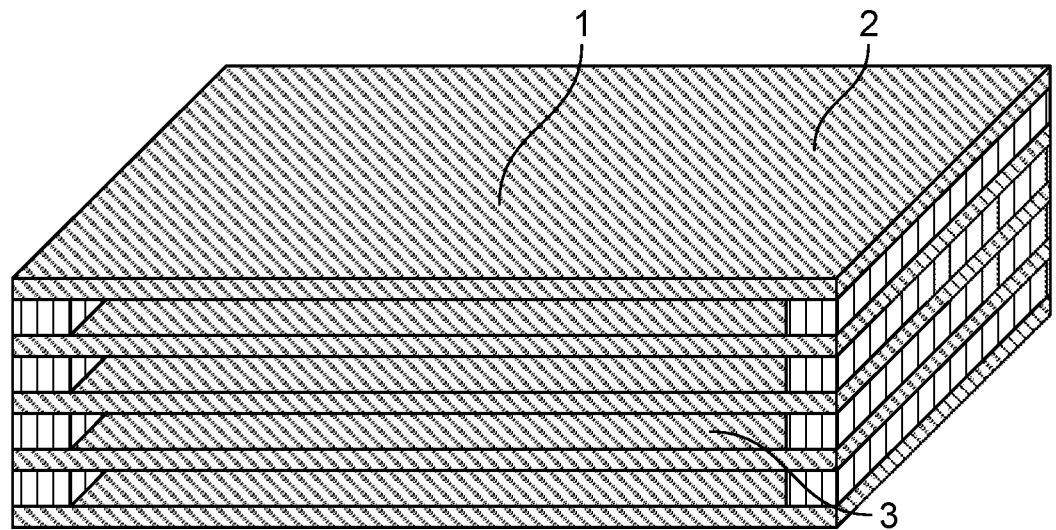
FIGS. 19A and 19B show an exemplary SGM made by layers reinforced by stiffening components, as illustrated by a schematic (FIG. 19A) and an image (FIG. 19B) of a four-layer SGM (constructed by glass fiber reinforced PDMS films). Arrows indicate the four layers. 1, reinforced fibers; 2, film; 3, gap.
Figure 19B:
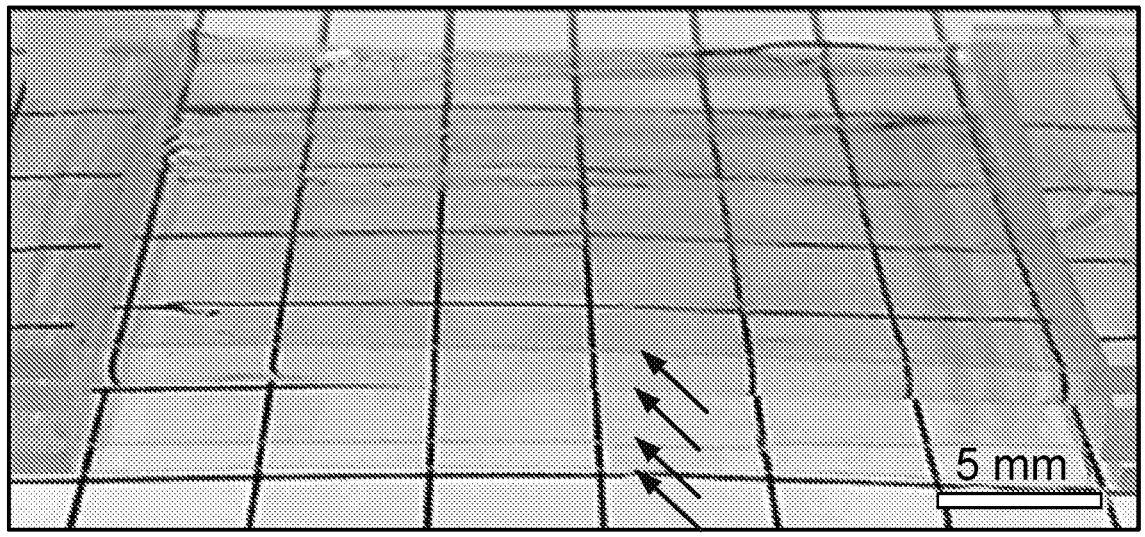

In one embodiment, the solid layers in SGM were reinforced. As shown in FIGS. 19A and 19B, a four-layer SGM was constructed using PDMS, similar to Example 12 except that glass fibers rather than magnetic components were added. The glass fibers were 10 μm in diameter and 0.25 inch in length. The composite PDMS films were processed by spin coating. First, 10 g PDMS was mixed with 1 g hardener and 10 mg glass fibers for 3 minutes at 60 rpm. A 3 inch×4 inch×⅛ inch glass slide was cleaned with acetone, IPA, and water, and dried at 100° C. for 10 minutes. The cleaned glass was then placed into the spin coater, followed by dropping 2 g of PMMA solution (A2) onto it. Spin coating was performed at 3000 rpm for 20 seconds. The PMMA coated glass was dried for 1 minute at 100° C. and placed back into the spin coater, and 2 g of PDMS solution was dropped onto it. Spin coating of PDMS was conducted at 2000 rpm for 20 seconds. The coated glass was dried at 120° C. for 40 minutes, and immersed into acetone to dissolve the PMMA layer between the PDMS film and the glass. The PDMS film was peeled off from the glass substrate, and washed in acetone for two times. The glass fiber reinforced PDMS film was cut into four pieces that were used to construct a four-layer SGM. The spacers were similar to those of the reference sample in Example 3. The thermal conductivity of the SGM made from the reinforced PDMS was similar to that of the reference sample in Example 3.

The reinforcements in SGM can be in any form, including but not limited to layers, particles, threads, rods, tubes, fibers, dots, blocks, multilayers, strips, bands, tapes, meshes, bundles, irregular shapes, and any combination or component thereof. The reinforcements can be made of any suitable material, including but not limited to metals, alloys, ceramics, glasses, carbon materials, polymers, elastomers, composites, and any combination or component thereof. The reinforcements can be attached to, embedded in, or penetrated through the solid layers.

Example 13: Conductive Solid Layers

Conductive solid layers can be used to construct SGM. Somewhat similar to the metal pieces in an electroscope, when they were like-charged, repulsive forces would be generated among adjacent layers.

Figure 20A:
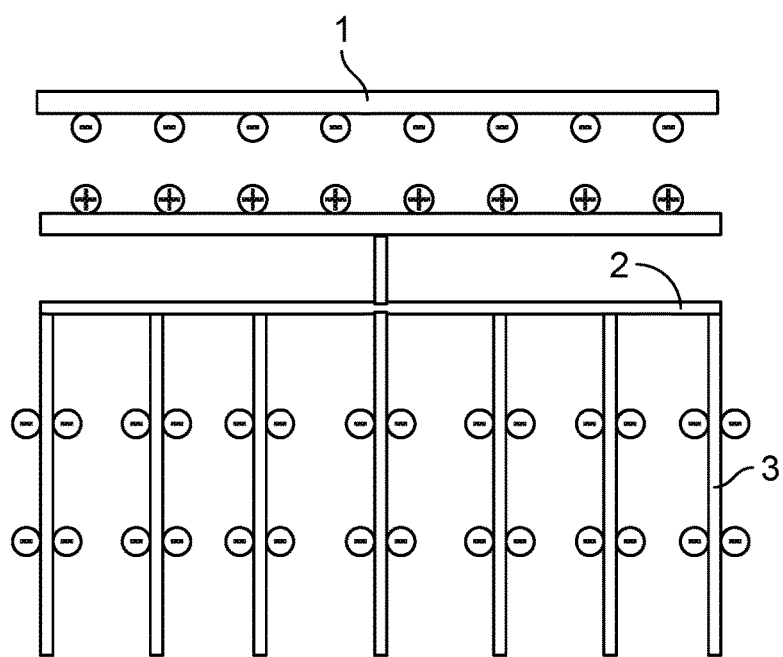
FIGS. 20A and 20B show exemplary conductive layers separated by repulsion forces generated through induction, as illustrated by a schematic (FIG. 20A) and an image (FIG. 20B) of a four-layer SGM constructed by Al coated PET films, separated by induction-induced repulsion force. 1, polymer electret; 2, needle; 3, conductive film.
Figure 20B:
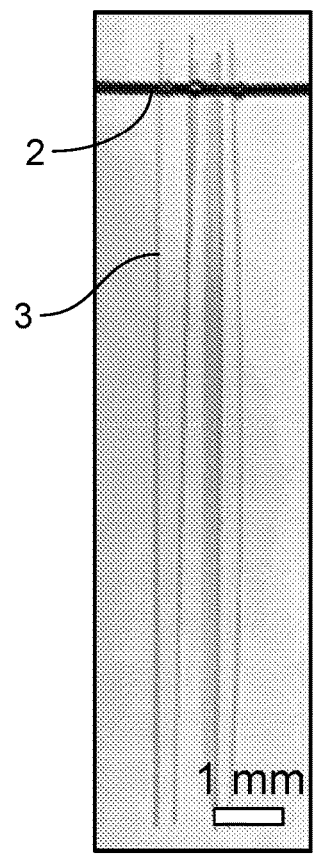

In one embodiment, as shown in FIGS. 20A and 20B, a SGM was formed from four layers of aluminum- (Al-) coated PET films (conductive and 25 μm in thickness), suspended on a conductive stainless steel needle; the left side of the needle was connected to a piece of conductive Al foil (10 cm×10 cm×25 μm). A piece of PET electret (Emfit electret film from Emfit Ltd.) was placed in parallel with the SGM, with the distance to the SGM being 5 mm. Upon the approach of the electret, the four layers of SGM repelled from each other. The PET electret size was the same as the SGM size. The Al-coated PET films were obtained from McMaster (Product No. 7538T11). The steel needle diameter was 0.5 mm, and its length was 5 cm. The charged SGM structure was quite stable. Its thermal conductivity was similar to that of the reference sample in Example 3.

The charge source can be any material or device that carries or can offer an external electric field. The solid layers of a SGM can be made from any conductive or semi-conductive materials, including, without limitation, metals, alloys, ceramics, carbon materials, glass, polymers, elastomers, composites, and any combination or component thereof.

Repulsion also can happen between two parallel conductive elements having the same current direction. The current can be generated by a battery, capacitor, or any other suitable power supply. The conductive elements (e.g., wires) can be attached onto or embedded into the solid layers. With the repulsion offered by the conductive elements, the solid layers can repel from each other. The conductive elements can be made from any conductive or semi-conductive materials, including but not limited to metals, alloys, ceramics, carbon materials, glass, polymers, elastomers, composites, and any combination or component thereof. The conductive elements can be in any configuration, such as bands, tapes, strips, wires, fibers, tubes, pipes, dots, curved shapes, straight shapes, particles, coatings, additives, fillers, blocks, irregular shapes, bilayers, multilayers, composites, and any combination or component thereof.

Example 14: Anti-Contact-Electrification Layers

Figure 21:
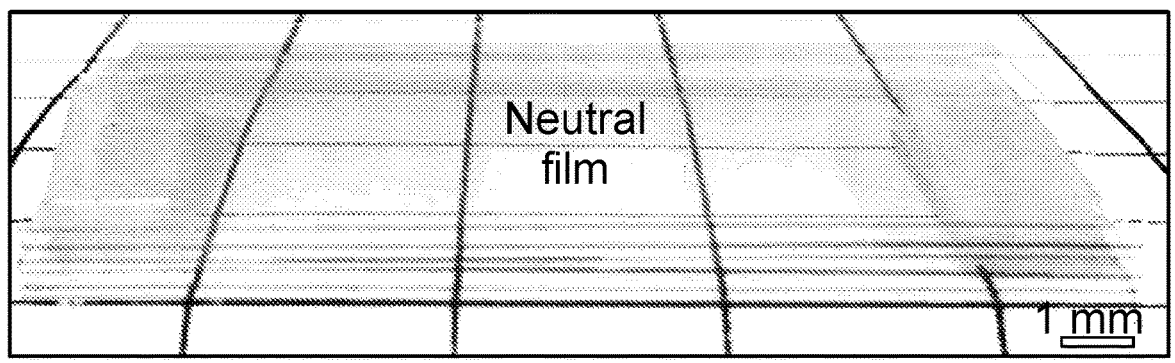
FIG. 21 is an image of an exemplary six-layer SGM constructed from anti-contact-electrification (ACE) films.

The solid layers in a SGM can be or contain anti-contact-electrification (ACE) layers, such that upon contact, electrification of adjacent layers is reduced (e.g., by at least 10%, at least 25%, at least 50%, or at least 95%) or suppressed. In one embodiment, as shown in FIG. 21, a six-layer SGM was constructed using PC films. The film thickness was 127 μm; the film width and length were 1 inch and 3 inch, respectively. The films were separated by spacers at the edges; the spacers were similar to that of the reference in Example 3. TWEEN® 20 surfactant, obtained from Sigma-Aldrich, was coated on the PC layers. TWEEN®-20 was first dissolved in IPA at a concentration of 0.5 wt %. The PC film was immersed in the solution for 5 seconds, removed, and dried in air for 20 minutes. As IPA evaporated, TWEEN®-20 was left on the PC films. Upon contact with each other, the coated PC exhibited little electrification. Their surface voltages before and after contact were always near zero, measured by a fieldmeter (Simco-ion, FMX-004). The thermal conductivity of the SGM was similar to that of the reference sample in Example 3.

The ACE treatment or processing techniques that can be used include, without limitation, ACE coating on solid layers, using ACE additives in solid layers, using ACE materials to produce solid layers, using AEC elements on solid layers, and any combination thereof. The ACE coating, additives, and elements include, for example, surfactants, amines, aliphatic amines, amides, organic salts, inorganic salts, quaternary ammonium salts, esters, esters of phosphoric acid, polyethylene glycol esters, polyols, metals, alloys, ceramics, glasses, polymers, elastomers, composites, carbon materials, and any combination or component thereof. The ACE coating, additives, and elements can be either uniformly or non-uniformly distributed. The ACE coating, additives, and elements can be either homogeneously or heterogeneously distributed. The ACE coating, additives, and elements distribution can be either isotropic or anisotropic. Useful processing methods for ACE coating, additives, and elements include, for example, dip coating, spin coating, spraying, open molding, painting, mixing, solvent processing, advanced placement, among others. The forms of the ACE coating, additives, and elements include, but are not limited to, particles, beads, dots, hollow beads, tubes, fibers, tapes, strips, fiber bundles, yarns, layers, multilayers, rods, irregular shapes, blocks, threads, straight objects, non-straight objects, and any combination or component thereof. The ACE coating, additives, and elements can either entirely or partially cover the solid layers in a SGM. In different solid layers within a SGM, the ACE coating, additives, and elements can be different.

Example 15: Application to Automobile Windows

Figure 22A:
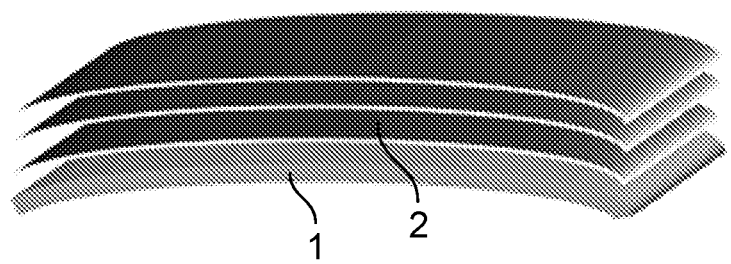
FIGS. 22A and 22B show an exemplary SGM applied to a curved substrate, as illustrated by a schematic (FIG. 22A) and an image (FIG. 22B) of a four-layer SGM on curved glass. 1, curved substrate; 2, curved SGM.
Figure 22B:
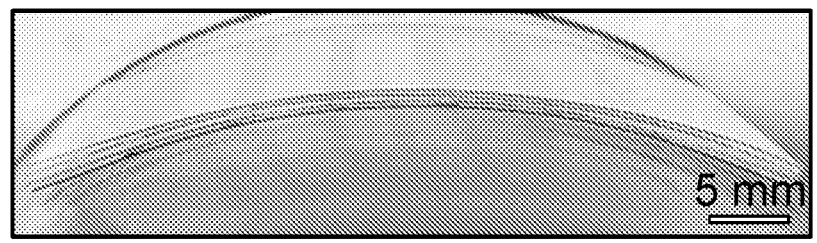

SGMs can be used to enhance thermal insulation of automobile windows. In one embodiment, as shown in FIGS. 22A and 22B, a four-layer SGM was firmly compressed onto a curved glass substrate that served as an analogue of an automobile windshield. The SGM materials and structure were similar to those of the reference sample in Example 3. The SGM was 3-inches-long and 1-inch-wide. The curved glass was 1 mm thick, with a curvature of 0.1/m; it was the outer surface of a crystallizing dish (190 mm in diameter, 100 mm in height). The contact between the SGM and the glass substrate was ensured by repeated compression. The thermal conductivity of the SGM-glass structure was similar to that of the reference sample in Example 3.

Example 16: Using Inner Pressure to Stabilize Multilayer Structures

Inner pressure can be used to help stabilize the gaps in a SGM. The solid layer material of a SGM can include one or more metals, alloys, ceramics, glass, carbon materials, polymers, elastomers, composites, or any combination or component thereof, provided that the solid layer can maintain the inner pressure of a gas or air within the gaps for a desired period of time. The gaps can be filled with any suitable type of gas or combination of gases. The inner pressure can vary from 0 to the strength of the SGM structure. In some cases, the air or gas in the gaps can be sealed by another type of solid or liquid.

Figure 23:
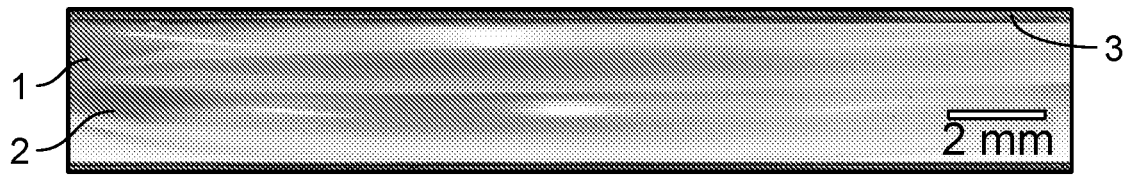
FIG. 23 is an image of an exemplary inner-pressure-stabilized multilayer structure. 1, aerated balloon #1; 2, aerated balloon #2; 3, glass.

For example, in one embodiment, as shown in FIG. 23, two air-filled rubber balloons were pressed together between two 0.5-mm-thick glass slides. The balloons were flattened by an external pressure. Because of the inner pressure, the upper wall and the bottom wall of balloon were stably separated. Such a structure was quite resilient upon repeated compression, because the air pressure in the rubber balloons was uniformly distributed. The thermal conductivity of such a SGM was similar to that of the reference sample in Example 3. By controlling the amount and type of gas within the balloon(s), the inner pressure within the SGM gaps can be adjusted.

Example 17: Stabilizing Multilayers Using Charged Materials

The separation of the solid layers of a SGM can be stabilized by charged particles, patches, rods, blocks, or layers attached onto or embedded into the solid layers. The charged components can be made from any materials that can retain charges, such as (without limitation) polymers, ceramics, glasses, elastomers, composite materials, semiconductors, and any combination or component thereof. The charged components can be attached onto the solid layer(s) by adhesives, electrostatic forces, or other joining methods.

Figure 24A:
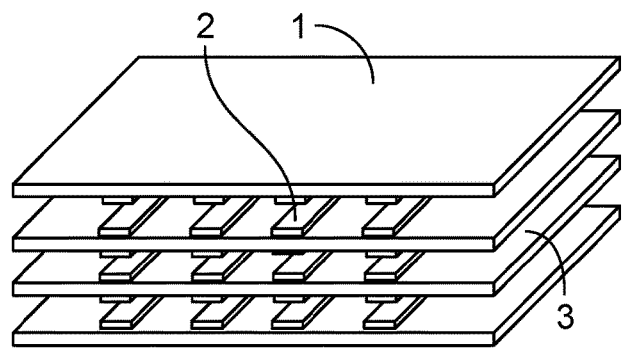
FIGS. 24A-24C show an exemplary SGM with charged polymer electret patches, as illustrated by a schematic (FIG. 24A), and a top view (FIG. 24B) and a side view (FIG. 24C) of photo images. 1, neutral film; 2, charged polymer electret patches (2 mm in width); 3, gap.
Figure 24B:
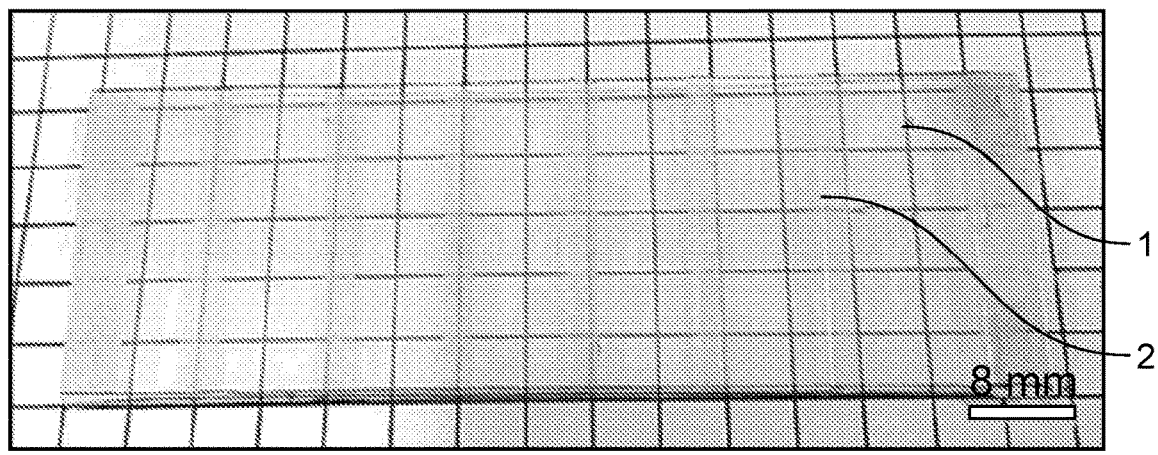
Figure 24C:
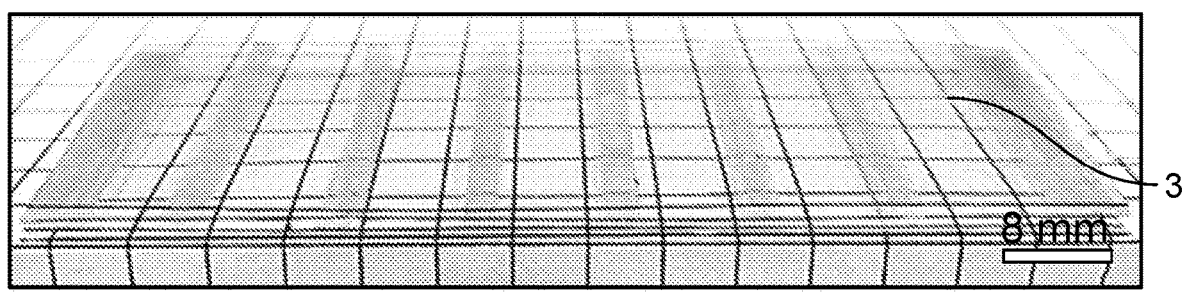

In one embodiment (FIGS. 24A-24C), a four-layer SGM was formed from 127-μm-thick PC films. Each film had six positively charged PET strips (25 μm in thickness, 2 mm in width) on each side. The charged PET strips were manufactured by corona charging, with a grid voltage of 2 kV. After charging, the bottom side of the PET film was washed with IPA and attached to the PC film. The SGM structure and its thermal conductivity was similar to those of the reference sample in Example 3.

Example 18: Using Bumps

The solid layers in a SGM can contain uneven features that help reduce the contact area between adjacent layers as the SGM is compressed. The features can have shapes that include, without limitation, bumps, wavy changes in layer thickness, dots, pillars, ridges, irregular-shaped patterns, threads, rods, tubes, blocks, particle-shaped materials, fibers, or any combination or component thereof. The features can be made of the same materials as the solid layers, or can be made from a different material or materials. The features can be made of metals, alloys, ceramics, glasses, carbon materials, polymers, elastomers, composites, or any combination or component thereof. The features may not contact each other or an adjacent solid layer when a low thermal conductivity of a SGM is desired; when a SGM is subjected to a compressive loading and deforms, the features of adjacent layers are in contact with either other or with the adjacent solid layer first, so that further increase in contact area of the layers can be suppressed. The features can be electrified or non-electrified, magnetized or non-magnetized, or ACE. The areas in solid layers around the features can be electrified or non-electrified, magnetized or non-magnetized, or ACE. The features and the surrounding areas can have different states of electrification, magnetization, or ACE properties. The features and the surrounding areas can be made of different materials.

Figure 25A:
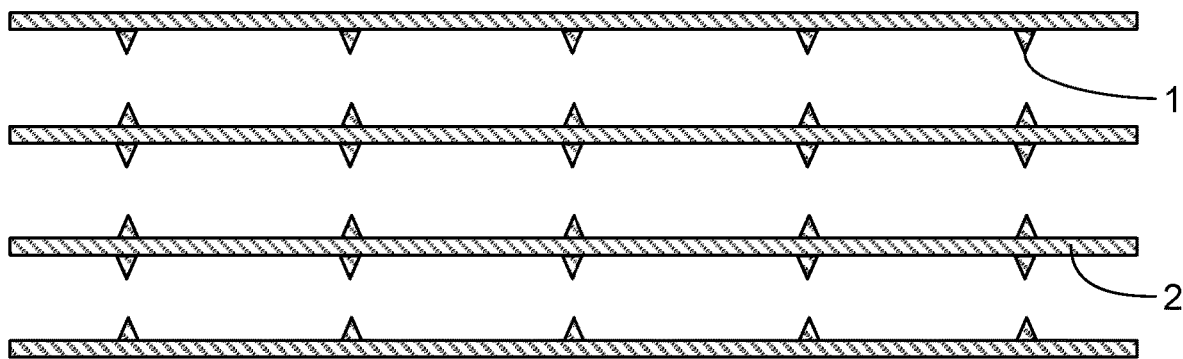
FIGS. 25A-25C show a schematic illustration of an exemplary SGM with bumps (FIG. 25A) to minimize the contact area upon compression, an image of an example film with bumps (FIG. 25B), and an image of an example four-layer SGM constructed by films with bumps (FIG. 25C). 1, bumps; 2, film.
Figure 25B:
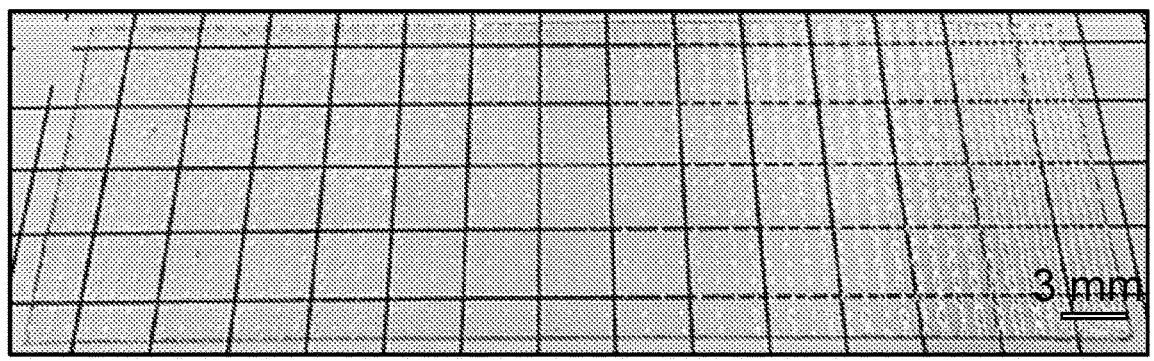
Figure 25C:
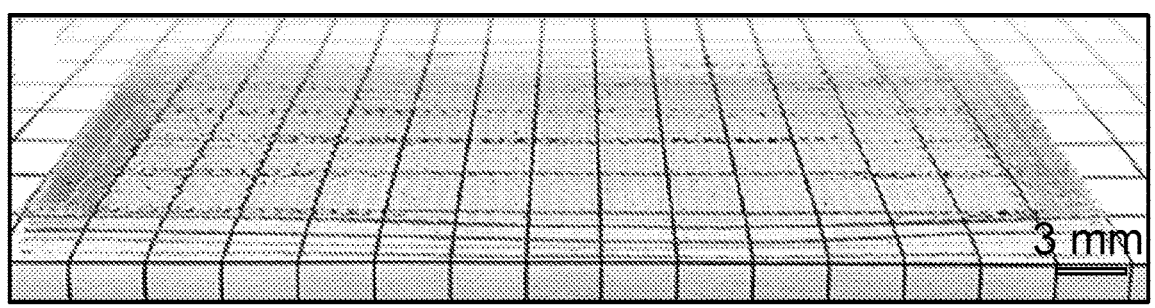

In one embodiment, 0.127-mm-thick PC films were thermoformed to produce surface bumps as illustrated in FIGS. 25A-25C. The size of the surface bumps was around 0.5 mm, and the distance between adjacent bumps was about 1 mm. The thermoforming temperature was about 30° C. lower than the melting point of PC. The PC film size was 3 inch×1 inch. A four-layer SGM was constructed using the PC films. Upon compression, the contacting area of the adjacent layers was reduced. The thermal conductivity of the SGM was similar to that of the reference sample in Example 3.

Figure 26:
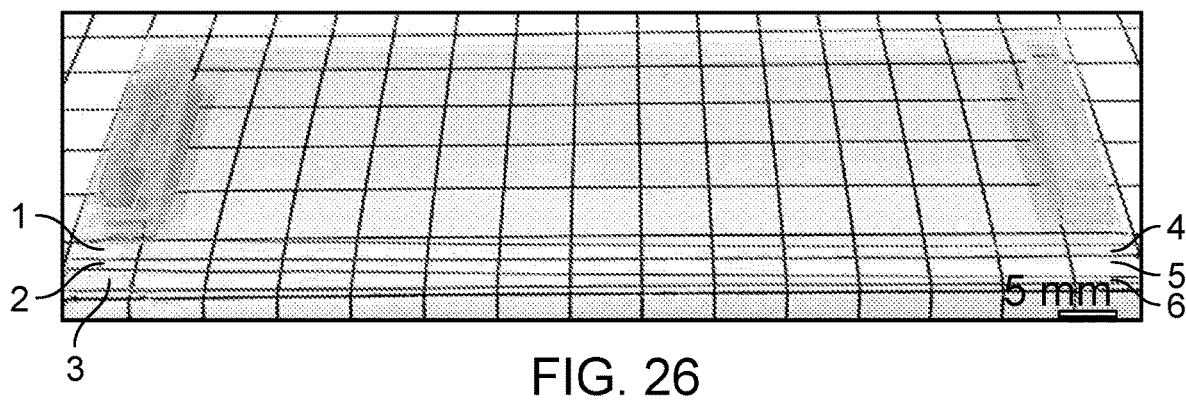
FIG. 26 shows an exemplary structure having variations in gap thickness along the surface of the structure. 1, 3, 5, 1 mm air gap; 2, 4, 6, 0.5 mm air gap.
Figure 27A:
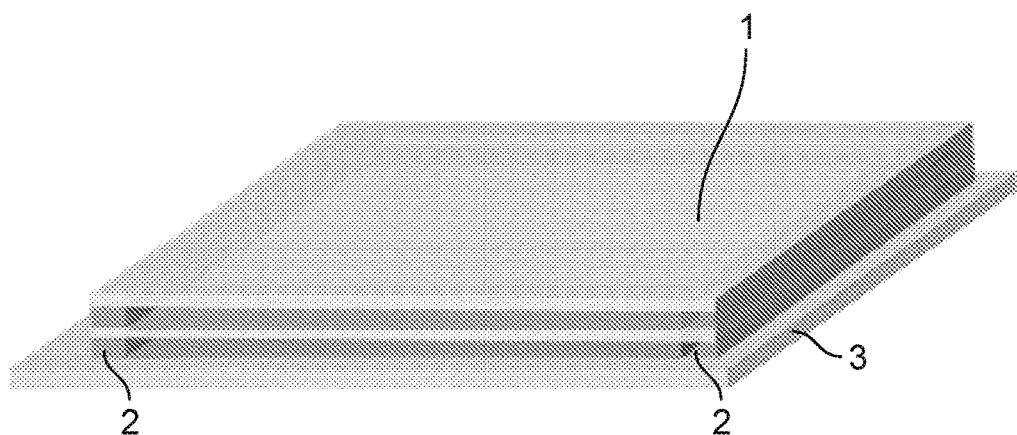
FIGS. 27A-27D are a schematic illustration (FIG. 27A) of an exemplary SGM constructed from thick PC films with thick gaps, images showing an example two-layer transparent SGM constructed from 500-μm-thick PC films with a 1 mm gap thickness (FIGS. 27B and 27C), and an image showing a side view at the corner of the two-layer SGM on a glass substrate (FIG. 27D). 1, film; 2, frame; 3, glass; 4, transparent 1 foot SGM.
Figures 27B, 27C, 27D:
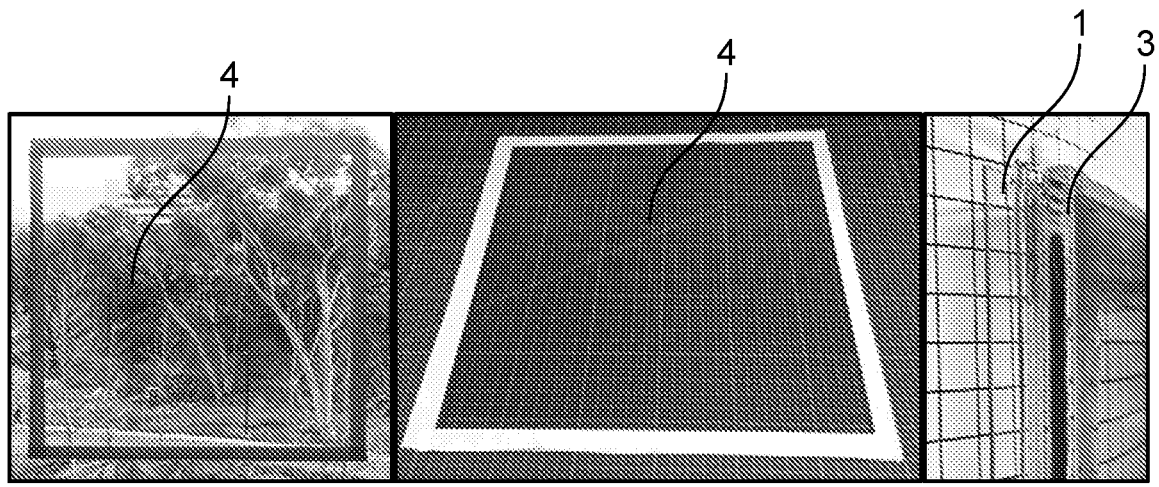

Example 19: Variations in Layer Thickness and Gap Thickness Along the Surface The thickness of the solid layers and the gaps in a SGM can vary along any surface direction. In one embodiment (FIG. 26), a four-layer GSM was constructed using 3 inch×1 inch×0.1 mm PET films having an ACE coating that was produced through dip-coating with TWEEN® 20 IPA solution, as described in Example 14. The PET films were separated by spacers made from strips of PC layer stacks. The PC strip width was ~3 mm and the length was the same as the dimension of the SGM. The thickness of the PC strips varied from 0.5 mm to 1 mm, controlled by the layer count in the PC layer stack, so that the gap thickness was uneven. As shown in FIG. 26, from bottom to top, on the left side, the spacers were 1 mm, 0.5 mm, and 1 mm in thickness, respectively; and on the right side, the spacers were 0.5 mm, 1 mm, and 0.5 mm in thickness, respectively. The thickness of a solid layer in a SGM also can be uneven. The thermal conductivity of such a SGM was similar to that of the reference sample in Example 3.

Example 20: Non-Charged, Non-Magnetized Structure

The solid layers in a SGM can be non-charged or non-magnetized. In one embodiment, a SGM was made using two 500-μm-thick 1 foot×1 foot PC films, separated at the four edges by 1-mm-thick, 10-mm-wide PC bar spacers (FIGS. 27A-27D) having rectangular cross sections. The PC films had been coated with an ACE agent produced by adding 0.6 mL TWEEN® 20 (Sigma-Aldrich, P9416) to 200 mL IPA, followed by ultrasonication for 5 minutes. The PC films were then soaked in the solution for 10 seconds, removed, and dried in air for 24 hours. The spacers were attached to the PC films at the edges using 3M™ double sided SCOTCH® tape. The SGM structure was robust and resilient. It could be flattened upon finger compression, and once the compressive force was removed, would restore to its initial configuration instantaneously. The thermal conductivity of the SGM was similar to that of the reference sample in Example 3.

Example 21. Joining of SGM/CARC on Edges

The solid layers in a SGM can be joined together at the edges. The solid layers can be made from, for example, one or more metals, alloys, ceramics, glasses, carbon materials, polymers, elastomers, composites, natural materials, or any combination or component thereof. The edges can be folded or partly folded. Spacers can be used in between the solid layers at the edges, or as discontinuous elements in the interior. Sealing methods that can be used to join the edges include, without limitation, thermal sealing, radial frequency (RF) sealing, ultrasonic sealing, spin, induction, friction stir, soldering, using adhesives, using tapes, mechanical joining or assembly such as riveting, screws, nails, tenons, plugs, slits, bolts, nuts, matching or mismatching patterns, or any combination thereof. The folded edges of solid layers or cover of SGM can be used to install the SGM on a substrate.

Figure 28:
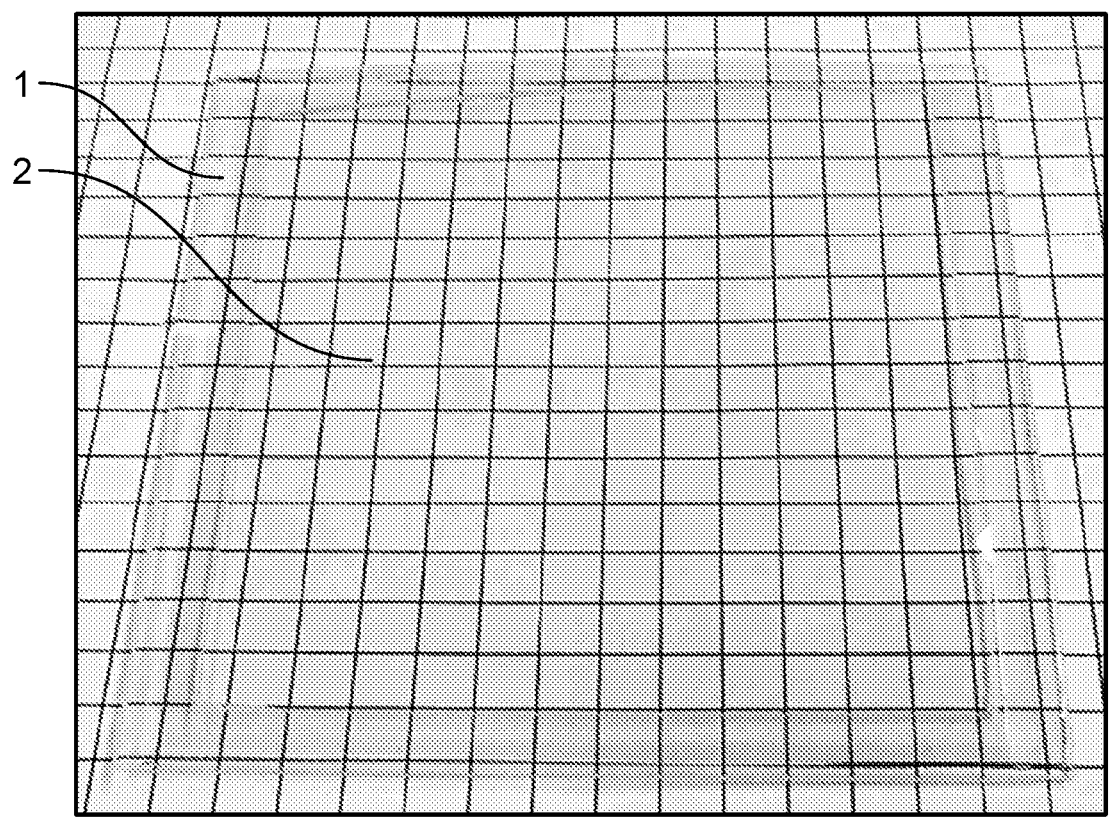
FIG. 28 is an image of an exemplary two-layer SGM with thermally sealed edges.

In one embodiment, a two-layer SGM was constructed. As shown in FIG. 28, the SGM consisted of two 127-μm-thick, 3×3 inch PC films. The films were separated by 380-μm-thick, 5-mm-wide PC bars at the edges. The PC films and the PC bars at the edges were firmly sealed together using an 8" tabletop impulse sealer (Uline, H-163). For each edge, the thermal sealing was conducted twice, first from the front and then from the back; each sealing operation took 15 seconds. The PC films had been coated with ACE agent, using a procedure similar to that used in Example 20. The thermal conductivity of the SGM was similar to that of the reference sample in Example 3.

In another embodiment, a two-layer SGM was constructed using two 127-μm-thick, 3×3 inch PC films with bent edges. The edges of the PC films were thermoformed using a Dental Emporium DP-015-1 Thermoforming machine. The mold was a 3×3×⅛ inch glass plate. The machine was first pre-heated for 5 minutes, and the PC film was then clamped onto the film holder and raised to the heating element for 2 minutes. The glass mold was placed on the vacuum bas, and the vacuum was turned on. The film holder was released and the film was lowered to conform to the mold. The vacuum was turned off and the film was allowed to cool to room temperature on the mold, and then removed. The edge depth of the front film was 3 mm; the edge depth of the back film was 1.5 mm. The two films were stack together, with the gap thickness being 1.5 mm. The outer surfaces of the edges of the back film were glued to the inner surfaces of the edges of the front film, using GORILLA GLUE® Impact-Touch superglue. The SGM was robust and resilient. The PC films had been coated with an ACE agent using a procedure similar to that used in Example 20. The thermal conductivity of the SGM was similar to that of the reference sample in Example 3.

Example 22. Pre-Stressed Solid Layers

The solid layers in a SGM can be pre-stressed. The magnitudes and the directions of the pre-stresses in different solid layers can be different. The solid layers can be non-planar. Different non-planar solid layers in a SGM can have different curvatures, and the directions of the curvatures of different solid layers can be different. The solid layers can be partly non-planar; the non-planar areas of different solid layers can have different locations. The pre-stresses can be generated thermally, mechanically, physically, chemically, optically, electrically, or using methods combining any of the aforementioned mechanisms.

For instance, in the second embodiment of Example 21, because the front film was slightly smaller than the back film, when the edges of the back film were forced into the edges of the front film, the front film was pre-stressed in tension and the back film was pre-stressed in compression.

Figure 29A:
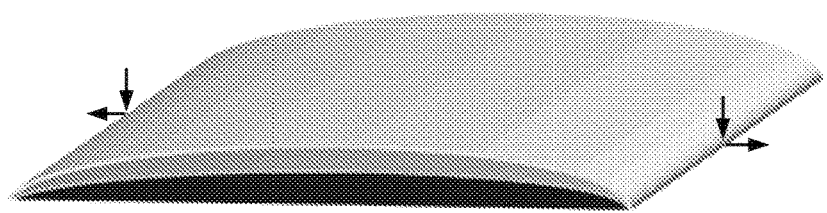
FIGS. 29A-29B are a schematic illustration (FIG. 29A) and an image (FIG. 29B) of an exemplary two-layer SGM made from pre-curved, pre-stressed layers.
Figure 29B:
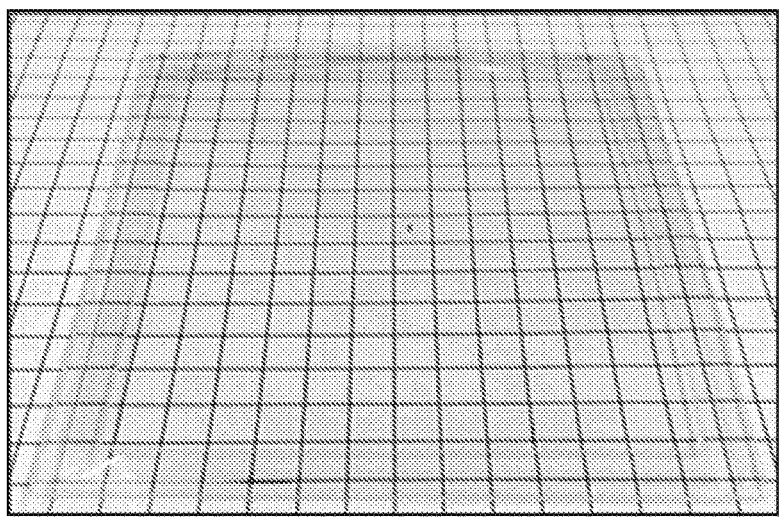

In another embodiment, a SGM was formed using two 127-μm-thick, 3×3 inch PC films. Residual stresses were generated thermally in the PC films, as shown in FIGS. 29A and 29B. The PC film was heated with a thermoforming machine (KeyStone Proline Machine III), with the heat source located at the top part of the machine. When the film was heated to about 30° C. lower than its melting point, the film expanded and bent downwards, indicating that thermal stresses were generated inside the film. After cooling, with the residual stresses, the height difference between the edge and the center of the film was around 1-2 mm. Two such films were used to form a SGM, with the edges separated by 0.5-mm-thick, 5-mm-wide PC bar spacers. The spacers and the PC films were attached together at the edges using double-sided tape. The SGM was robust and resilient. The thermal conductivity of the SGM was similar to that of the reference sample in Example 3.

In yet another embodiment, a two-layer SGM was formed from two PC films, similar to the above embodiment. The PC films were initially curved through the same thermal treatment as in the above embodiment. During the assembly process, the two films were procedurally flattened, by stretching them along the surface direction, and the edges were affixed to the spacers. The solid layers in the assembled SGM were quite flat, with residual stresses. The SGM was robust and resilient. The thermal conductivity of the SGM was similar to that of the reference sample in Example 3.

In yet another embodiment, the solid layers in a two-layer SGM were rendered non-planar by applying bending moments on them during the assembly process. The SGM was formed from two 127-μm-thick, 3×3 inch PC films. The two films were separated at the edges by 0.5-mm-thick, 5-mm-wide PC bar spacers. The spacers and the PC films were attached together at the edges by using double-sided tape. During the assembly process, the top film was procedurally bent upward, with the edges fixed by the spacers. Thus, pre-stresses were generated in both the top film and the bottom film. The SGM was robust and resilient. The thermal conductivity of the SGM was similar to that of the reference sample in Example 3.

Example 23. Installation of a SGM on a Substrate

Figure 30A:
FIGS. 30A and 30B are illustrations of an exemplary SGM made from 0.01" thick polycarbonate films, where the SGM has bent edges (FIG. 30A) or a frame (FIG. 30B). 1, films; 2, bent edges; 3, installation location; 4, frame.

A SGM can be installed on a substrate using various suitable means. In one embodiment (FIG. 30A), a PC film (3.2 inch in length, 1 inch in width, 0.01 inch in thickness) was permanently bent on two opposite sides, and used as the substrate. The height of the bent edges was 0.1 inch; the bent edges were substantially perpendicular to the central portion of the substrate. A two-layer SGM with a length of 3 inches was installed between the two bent edges of the substrate. The two-layer SGM was constructed by bending the edges of 0.01-inch-thick PC films of appropriate sizes. For the upper film, the initial length was 3.2 inch. After bending, the distance between the deformed edges was 3 inch. For the lower layer, the distance between the deformed edges was 0.5 mm less than that of the upper film. The two PC films formed a stack. The overlapping bent edges were thermally sealed together using the same procedure as in Example 21. LOCTITE® 404™ was injected between the bent edges of the substrate and the SGM, to enhance bonding strength and sealing. The thermal conductivity of the SGM was similar to that of the reference sample in Example 3.

Figure 30B:
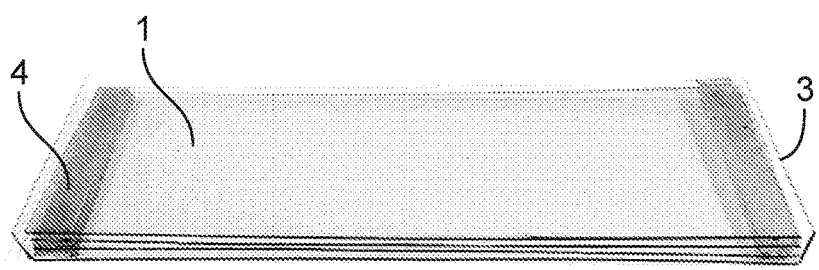

In another embodiment (FIG. 30B), a 3-inch-long, 1-inch-wide SGM was constructed from three 0.01-inch-thick PC films. The gap thickness was controlled by the spacer height between the films. For each film, spacers were placed at two ends along the longer direction. The spacer was made of 1-inch-long, 0.1-inch-wide, 0.02-inch-thick PC strips. Both sides of the spacer were coated with 3M™ double-sided SCOTCH® tape. The SGM was mounted between the two bent edges of the substrate. Separate spacers also were used between the SGM and the bent edges of PC substrate. The thermal conductivity of the SGM was similar to that of the reference sample in Example 3.

The installation of a SGM on a substrate can be based on, for example, adhesion, insertion, friction, placement, attachment, welding, fusion, induction, mechanical joining, assembly, electrostatics, pressure, barometric pressure, stitching, magnetic forces, tapes, anchors, hooks, pins, absorption, adsorption, soldering, or any combination or component thereof. In some cases, a SGM can first be assembled with a frame, and then installed onto the substrate. The substrate and SGM can contain one or more frames, sashes, borders, grooves, notches, slots, slits, holes, trenches, or necks, among other components.

Example 24: Folding Frame

Figure 31:
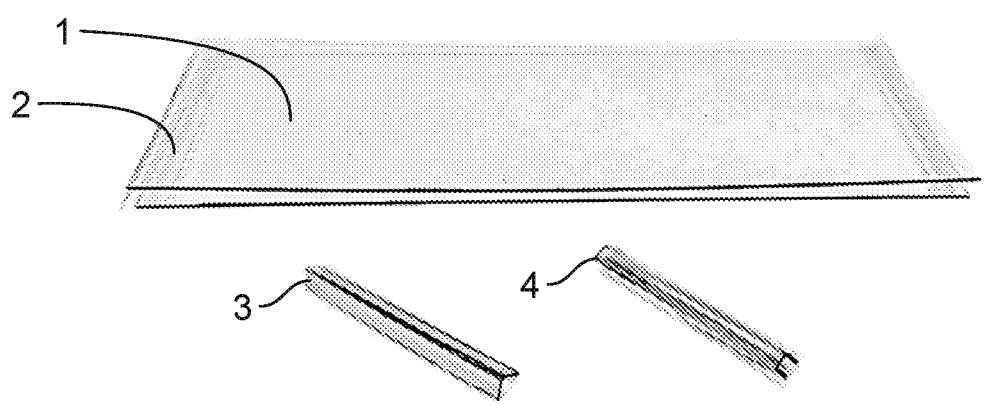
FIG. 31 is an image showing an exemplary two-layer SGM made from 0.01" thick polycarbonate films, with a folding/unfolding frame. 1, films; 2, angle frame; 3, V-frame; 4, U-frame.

A SGM can have a self-unfolding or self-folding component, as illustrated in FIG. 31. For instance, when the component is folded, a SGM can be stored, and when the component is unfolded, SGM can be installed. The unfolding-folding operation can be reversible. Such a mechanism can be used to align certain sections of solid layers in the SGM.

In one embodiment, a self-folding frame and spacer of a SGM were produced. The frame and spacer that separated the solid layers contained a hinge-like structure. A two-layer SGM was constructed using two 3-inch-long, 1-inch-wide, 0.01-inch-thick PC films. Hinge-like spacers, i.e., frame components, were made from 1-inch-long, 0.1-inch-wide, 0.01-inch-thick foldable PC strips; the strips were adhered to the PC films at the longer edges. The strips were partly cut, with a cutting depth on each side of about 50 so they could be reversibly folded or unfolded along the cutting lines, and the folding or unfolding angles could be well controlled. In some cases, multiple cutting lines in parallel and in close proximity with each other provided for more than two leaves. The sample shown in FIG. 31 used three-leaf spacers. The leaves of the spacer were attached onto the films using an adhesive (LOCTITE® 404™). The opening angle was changed by pressing one layer to adjust the relative position of the two films. The thermal conductivity of the SGM was similar to that of the reference sample in Example 3.

Folding and/or unfolding components that can be used in a SGM include, without limitation, hinges, fractured materials, angles, leaves, layers, rods, fibers, ropes, knots, meshes, fabrics, mats, threads, bundles, tubes, pipes, reducers, connectors, adaptors, partly fractured materials, folded materials, connectors, spindles, joints, flexible materials, porous materials, gels, elastomers, metals, alloys, polymers, springs, smart materials, ceramics, glasses, carbon materials, composites, and any combination or component thereof.

Example 25. Low-Emissivity Materials

Figure 32:
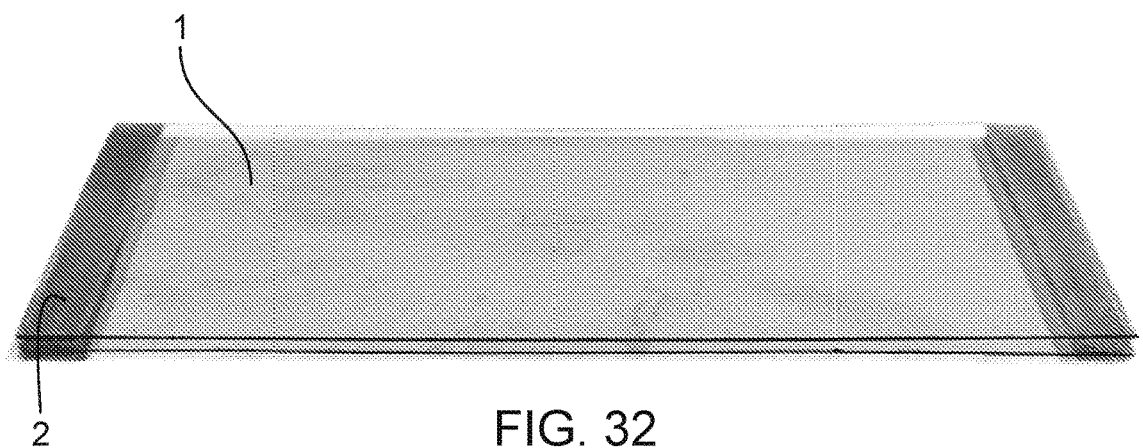
FIG. 32 is an image of an exemplary two-layer SGM constructed from low-emissivity materials (in particular, poly(ethylene terephthalate) (PET) film with a low-emissivity coating). 1, film; 2, spacer.

A SGM can contain one or more low-e materials. In one embodiment (FIG. 32), a two-layer SGM was constructed from two indium-tin-oxide (ITO) coated Mylar slides, obtained from SPI Supplies (Product No. 06455-AB). The length, width, and thickness of the ITO coated films were 3 inches, 1 inch, and 0.02 inch, respectively. The structure and the thermal properties of the SGM were similar to those of the reference sample in Example 3. The spacers that determined the gap thickness were made of 1-inch-long, 0.1-inch-wide, 0.02-inch-thick PC strips. Both sides of the spacers were covered by 3M™ double-sided SCOTCH® tape. The thermal conductivity of the SGM was similar to that of the reference sample in Example 3.

Low-e materials that can be included in a SGM include, but are not limited to, layers, blocks, rods, tubes, multilayers, coatings, patches, sheets, fibers, threads, foams, honeycombs, fabrics, or mats containing silver, copper, gold, zinc, tin, chromium, silicon, carbon nanotubes, carbon fibers, graphene, zinc oxide, tin oxide, titanium oxide, indium tin oxide, vanadium oxide, aluminum-doped zinc oxides, oxides, doped materials, coated materials, metals, alloys, ceramics, glasses, polymers, elastomers, carbon materials, composites, or any combination or component thereof. The low-e mechanism includes, for example, thermal reflection, thermal absorption, thermal blocking, and any combination or component thereof.

Example 26. Soundproof Materials

Figure 33:
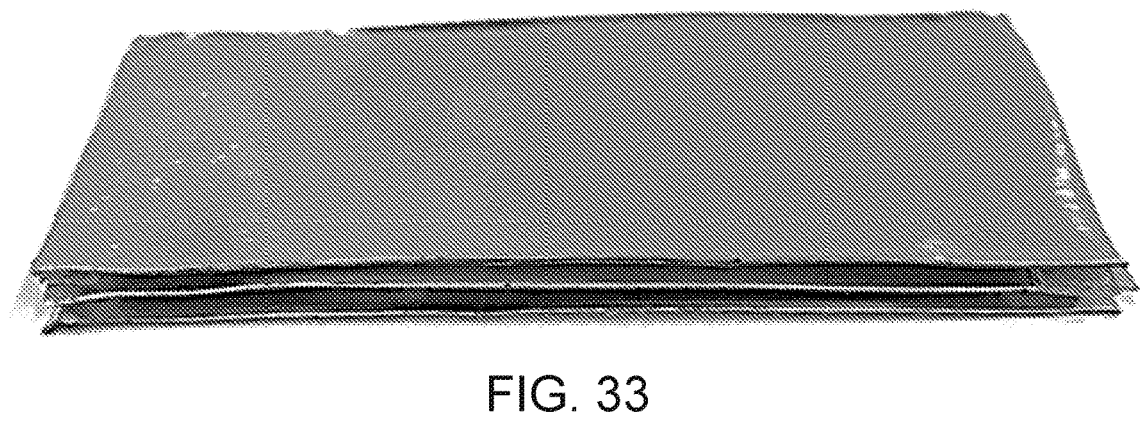
FIG. 33 is an image of an exemplary three-layer SGM constructed from soundproof material (specifically, noise-damping foil tape).

SGM can contain soundproof materials. In one embodiment (FIG. 33), a four-layer SGM was constructed using four noise-damping foil tapes, obtained from McMaster-Carr (Product No. 6307A21). The layer length, width, and thickness were 3 inches, 1 inch, and 0.01 inch, respectively. The structure and the thermal properties were similar to those of the reference sample in Example 3. The spacers that determined the gap thickness were 0.1-inch-wide and 0.02-inch-thick. Both sides of the spacers were covered by 3M™ double-sided SCOTCH® tapes. Soundproof mechanisms that can be used in a SGM include, but are not limited to, damping, absorption, reflection, diffusion, and or combination or component thereof. Soundproof materials that can be used for a SGM include, for example, acoustical panels, foams, sheets, coatings, curtains, layers, fabrics, mats, blocks, fibers, tubes, and bundles of mass loaded vinyl, noise absorbers, metals, alloys, polymers, elastomers, glasses, carbon materials, ceramics, composites, and any combination or component thereof.

Example 27. Filling Gaps with Different Gases

Figure 34:
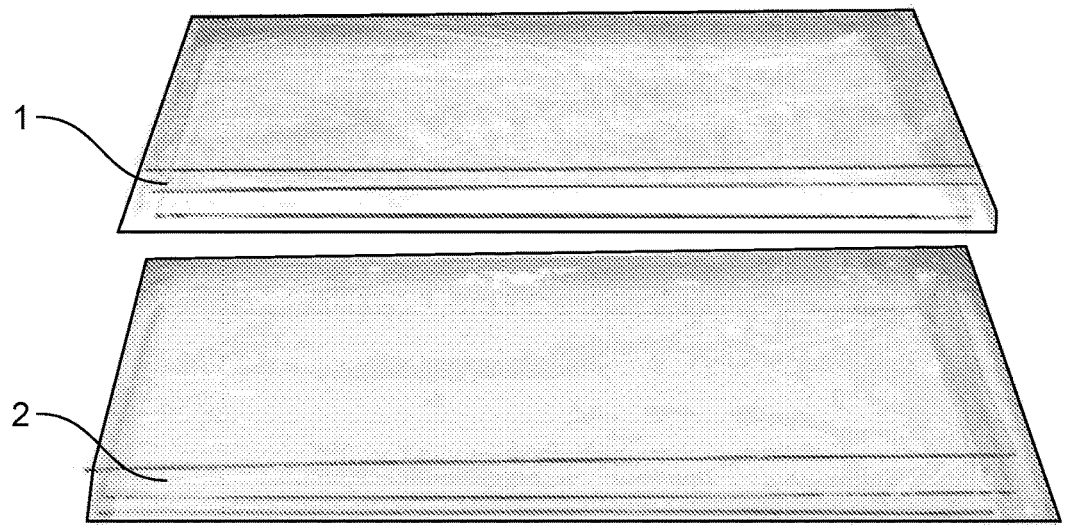
FIG. 34 shows images of exemplary SGMs having gaps filled with argon (top) or nitrogen (bottom) gas. 1, Ar gas filled layer; 2, $N_2$ gas filled layer.

The gaps in a SGM can be in vacuum, or can be filled or partly filled with air, argon, nitrogen, water, water vapor, or any other gas or liquid, or any combination or component thereof. In one embodiment, as shown in FIG. 34, a SGM was constructed using three 3-inch-long, 1-inch-wide, 0.01-inch-thick layers of PC. The PC layers were separated by two bladders filled with different gases. The bladders were produced by folding 10-µm-thick plastic films (Kirkland Signature Stretch-Tite Plastic Food Wrap), with the edges thermal-sealed using an 8" tabletop impulse sealer (Uline, H-163). The bladders were filled with nitrogen ($N_2$) gas or argon (Ar) gas. Because of the inner pressure provided by the gas, the upper wall and the bottom wall of the bladder were stably separated.

Example 28. Removing Materials to Form a SGM

Figure 35:
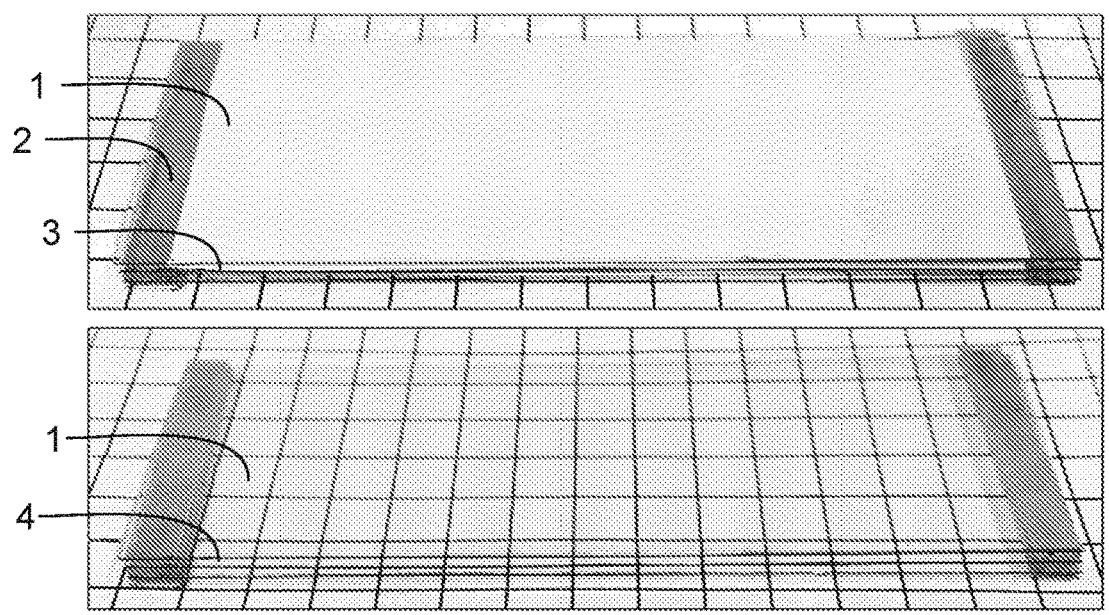
FIG. 35 shows images of an exemplary three-layer SGM made from 0.01" thick PC films, before (top) and after (bottom) removal of paper layers from between the film layers. 1, films; 2, spacer; 3, separation layer for storage, and installation; 4, air gap after removal of separation layer.

The gaps in a SGM can be formed by removing materials between solid layers. In one embodiment (FIG. 35), a four-layer SGM was constructed using four 3-inch-long, 1-inch-wide, 0.01-inch-thick PC films. Initially, the PC films were separated by 3 paper layers (FIG. 35, top). Each paper layer consisted of five 0.1-mm-thick printer papers that formed a stack. The paper layers were 2.8 inches in length and 1 inch in width. At the edges of the SGM, spacers were adhered to the PC films. The spacer structure was similar to that of the reference sample in Example 3. The spacers were 1 inch in length, 0.1 inch in width, and 0.02 inch in thickness. Both sides of the spacers were covered by 3M™ double-sided SCOTCH® tape. After the PC films and the paper layers were formed into an alternating layer stack, the paper layers were pulled out, leaving the empty spaces between the PC films as air gaps (FIG. 35, bottom). Thus, the SGM was produced. The thermal conductivity of the SGM was similar to that of the reference sample in Example 3. The materials that can initially occupy or partly occupy the air gaps in a SGM include, but are not limited to, metals, alloys, polymers, elastomers, ceramics, glasses, carbon materials, composite materials, liquids, gels, gases, foams, honeycombs, fibers, particles, or any combination or component thereof. The removal methods of the materials initially occupying or partly occupying the air gaps in a SGM include, without limitation, etching, dissolution, chemical reactions, heating, cooling, cutting, milling, machining, impact, compression, pulling, shearing, bending, twisting, mechanical removal, optical methods, charging, discharging, using magnetic methods, using electrical methods, or any combination or component thereof.

Example 29. Surface Treatment and Control of Hydrophobicity or Hydrophilicity

The hydrophobicity or hydrophilicity of the solid layers in a SGM can be controlled in a broad range. In some cases, the solid layers in SGM can be surface treated.

In one embodiment (FIG. 36, top), a SGM was formed using 3-inch-long, 1-inch-wide, 0.01-inch-thick PC films. The PC film surface was treated with corona charging so that it was highly hydrophilic. The corona charging was conducted using a CCS system as described in Example 9. The needle voltage, grid voltage, needle-film distance, grid-film distance, temperature, and charging duration were 12 kV, 2 kV, 40 mm, 4 mm, 60° C., and 60 seconds, respectively. After charging the PC films, three charged PC films formed a three-layer SGM. Spacers were attached between the films at their edges. The spacers were 1-inch-long, 0.1-inch-wide, and 0.02-inch-thick. Both sides of the spacers were covered by 3M™ double-sided SCOTCH® tapes. One drop of water was placed onto the corona charged upper layer, showing that the contact angle was less than 90°.

Figure 36:
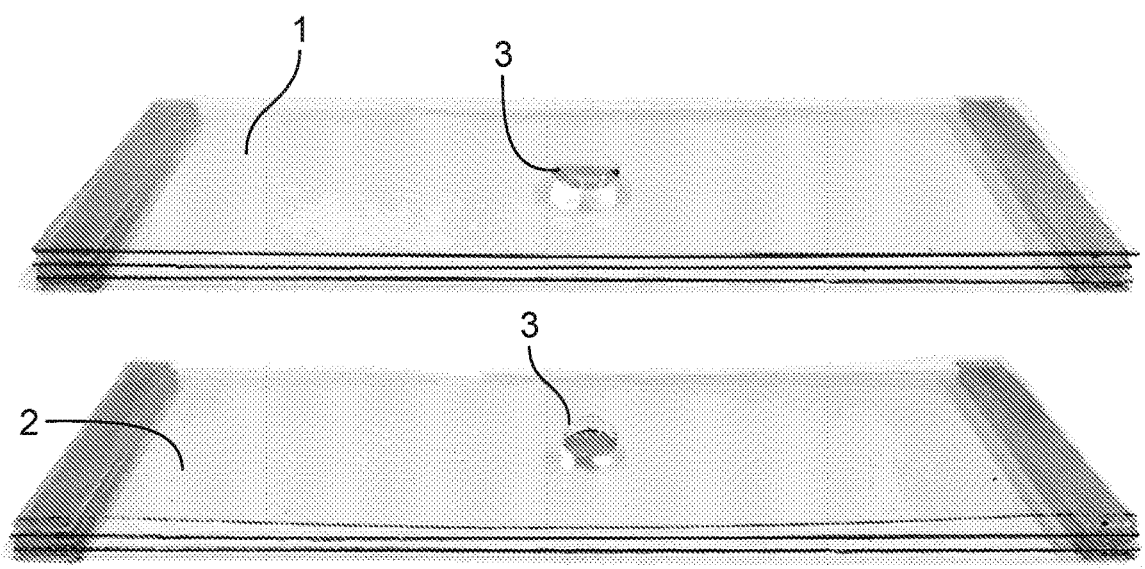
FIG. 36 shows images of three-layer SGMs made with films having a controllable degree of hydrophobicity/hydrophilicity. The top image shows a SGM made from films with a hydrophilic surface, and the bottom image shows a SGM made from films having a hydrophobic surface. 1, hydrophilic film; 2, hydrophobic film; 3, water drop.

In another embodiment (FIG. 36, bottom), SGM was formed from three PC layers of the same size and thickness as the embodiment shown in the top panel of FIG. 36. The PC films were dip-coated with silicon oil by immersing them into a 3 wt % IPA solution of silicon oil for 1 minute, and then removed and dried in ambient air. The silicon oil-coated PC films were hydrophobic. The spacers were the same as those in the top panel of FIG. 36A. One drop of water was placed onto the upper layer to show that the contact angle was larger than 90°.

The purposes of surface treatment of SGM layers include, but are not limited to, to control the degree of hydrophobicity, to control the degree of hydrophilicity, to control surface tension, to provide anti-reflection, anti-static, anti-abrasion, or anti-condensation characteristics, and any combination thereof. The coating materials include, but are not limited to, layers, multilayers, dots, patches, fibers, tubes, bundles, blocks, and clusters of liquids, solids, oils, fluoropolymers, calcium carbonate, oxides, polystyrene, magnesium oxide, zinc oxide, ceramics, glasses, carbon materials, alloys, metals, polymers, elastomers, composites, nanocomposites, and any combination or component thereof. Suitable treatment methods include, but are not limited to, coating, plasma treatment, corona charging, glowing, conditioning, moisturizing, thermal treatment, hydrothermal treatment, roughness modification, chemical treatment, tempering, etching, and any combination or component thereof. Anti-reflection treatment methods include, but are not limited to, surface patterning, monolayer coating, multilayer coating, and decoration with $MgF_2$, ZnO, $SiO_2$, $TiO_2$, PDMS, PMMA, other materials possessing different reflection indexes from the solid layer, and any combination or component thereof. Anti-static treatment methods can include, without limitation, the means listed in Example 14, and anti-abrasion treatment methods include, without limitation, lubrication, coating with hard materials, protective layers, surface patterning, and any combination or component thereof.

Example 30: Frame for SGM

A SGM can have a frame. Frame components include, for example, bars, angles, tapes, strips, hinges, joints, connectors, reducers, adaptors, particles, rods, curved components, pipes, tubes, taped components, straight components, layers, multilayers, blocks, irregular-shaped parts, and any combination or component thereof. The materials of a frame may include one or more metals, alloys, polymers, elastomers, composites, ceramics, glasses, carbon materials, and any combination or component thereof, for example. A frame can be assembled or disassembled, and may stretch or compress a SGM. A frame can twist, tilt, or bend a SGM having a non-zero angle. The frame can be fixed, installed, or removable.

Figures 37A, 37B:
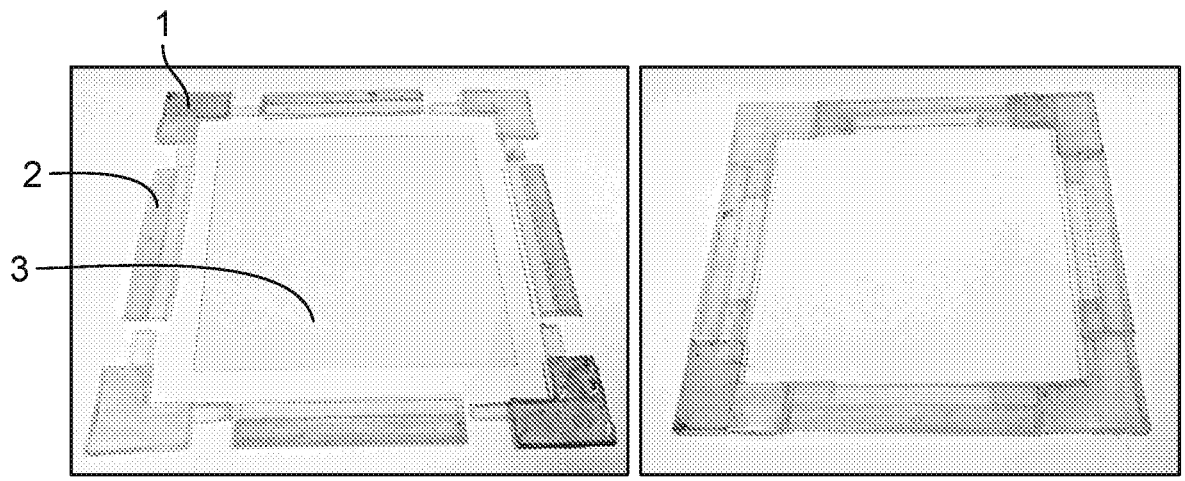
FIGS. 37A and 37B are images showing a SGM before (FIG. 37A) and after (FIG. 37B) of the film layers in a frame.
Figure 37C:
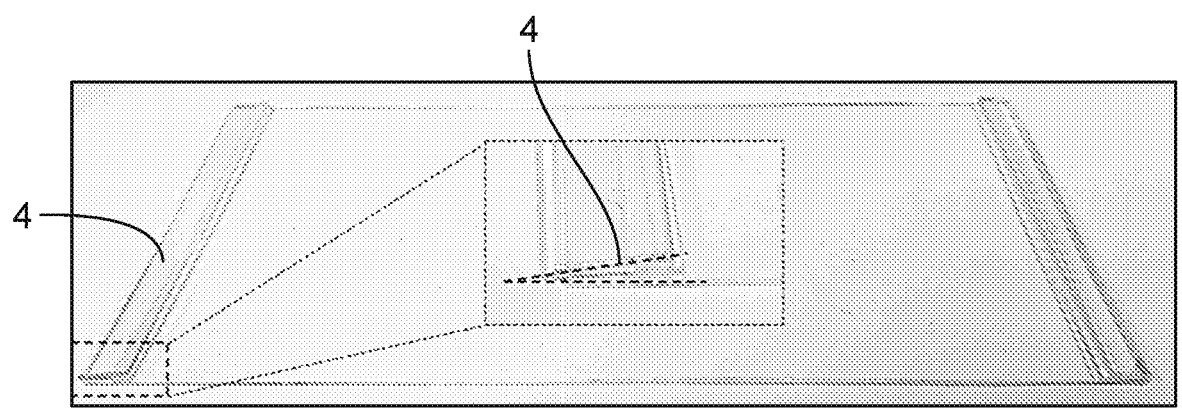
FIG. 37C is an image showing a frame bar with an angle (inset). 1, corner connector; 2, frame bar; 3, films; 4, frame bar with angle.

In one embodiment (FIGS. 37A-37C), a SGM in a frame was constructed. The frame included four bars and four angles. Each bar was made from three 2.8-inch-long, 0.2-inch-wide, 0.5-mm-thick PC strips and two 2.8-inch-long, 0.1-inch-wide, 0.01-inch-thick PC strips. Each narrower strip was sandwiched between two wider strips. The strips were adhered together by 3M™ double-sided SCOTCH® tapes. The free space between the wider strips, left by the narrower strip, was available to host PC films—the solid layers in a SGM. The angle had a similar layered structure as the bars, except that it was in angle form for placement at the corners of the SGM; the strips had different lengths, so as to connect to the bars. After the bars, the angles, and the PC films were assembled, a two-layer SGM was produced. The joining of the PC films, bars, and angles were secured by superglue.

In another embodiment, the SGM and frame were similar to those of the above embodiment, except that the frame size was larger than the PC film size by 1 mm. After assembly, the PC films were stretched.

In yet another embodiment, the SGM and frame were similar to those of the above embodiment, except that the frame size was smaller than the PC film size by 1 mm. After assembly, the PC films were compressed and slightly buckled.

In yet another embodiment (FIG. 37C), a two-layered SGM was assembled with two PC films and a frame, with a certain installation angle. The PC films and the construction method of SGM were similar to those in the above embodiment, except that the upper surface and the lower surface of the frame were not in parallel, but formed a ramp. Each side of the frame consisted of two PC bars; one bar was 4 mm wide and the other was 1.5 mm wide. The two bars were of the same length. The narrower frame bar was inserted underneath the wider frame bar, causing an angle between the wider frame bar and the bottom film. With the installation angle, the upper PC film was curved and more stably separated from the bottom PC film. Depending on the size, material, layer number, and other parameters of the SGM, the angle can range from −90° to 90°, and can vary from layer to layer. The angle can be generated by a number of methods, including, for example, methods that utilize ramps, bars, dots, tilted slots, leaves, edges, corners, tilted layers, tilted sections, uneven sections, folding layers, folding bars, threads, and/or blocks. These elements can be attached to, within, on, under, or next to the solid layers, the frame, or the air gaps. The angle(s) can be generated at one, two, a few, or all of the edges of solid layers.

Example 31: Cutting and Shaping SGM

A SGM can be cut and shaped in numerous ways. Before cutting, the SGM may be fixed by pins, or mounted onto a substrate. Any suitable size and shapes can be obtained by cutting and shaping the SGM.

Figure 38:
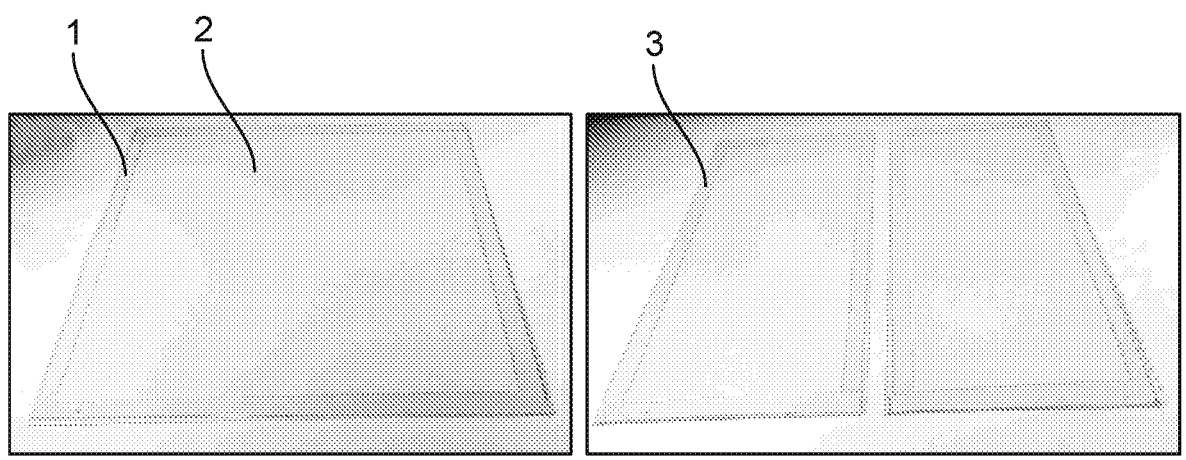
FIG. 38 is a pair of images showing the cutting and shaping of a SGM by adding new frame components before cutting (left) and after cutting (right), with added new frame components. 1, frame; 2, polymer films; 3, inserted new frame component.

In one embodiment (FIG. 38), a two-layer SGM was constructed from 4-inch-long, 4-inch-wide, 0.01-inch-thick PC films. A frame with the same size of the films also was made from PC; its thickness was 0.02 inch. The width of the frame was 4 mm. Before cutting, the SGM was mounted onto a piece of paper using SCOTCH® tape for a secure attachment. A scissors was then used to cut the SGM along its center line. After cutting, two PC strips with a length of 93.6 mm, width of 4 mm, and thickness of 0.02 inch were inserted into the opening from the cut. All the frames were covered with 3M™ double-sided SCOTCH® tape.

Example 32: Enhanced Heat Exchanger

A stabilized SGM structure can be used to increase the surface area of a heat exchanger, low MFG cost, simple structure. If the layers and gaps are thin, the total surface area will be larger than that of a standard heat exchanger. The solid layer materials can include, for example, copper, brass, aluminum, silver, and other thermally conductive metals, polymers, ceramics, carbon materials, etc. Different gaps can host different fluids, including air, coolant liquid, etc.

Figure 39:
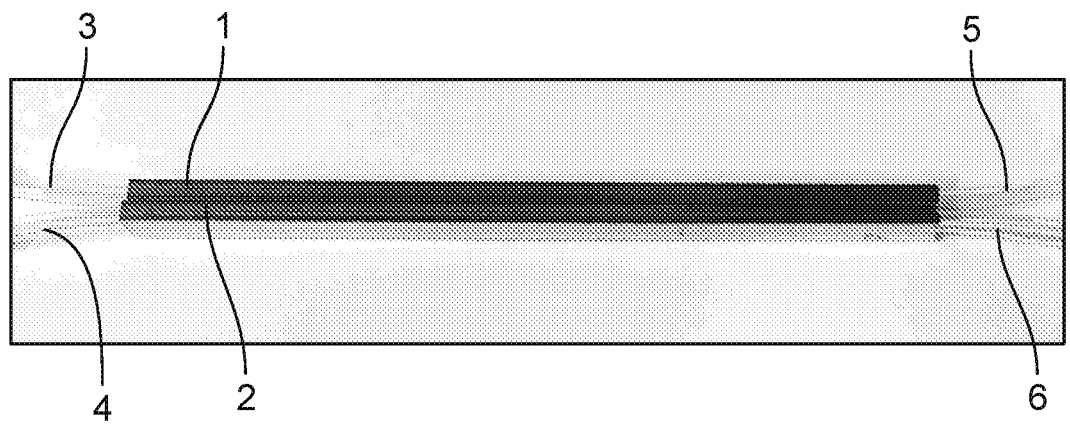
FIG. 39 is an image showing an enhanced heat exchanger made by SGM. 1, rectangular brass tube for carrying hot water; 2, rectangular brass tube for carrying cold water; 3, hot water inflow; 4, cold water inflow; 5, hot water outflow; 6, cold water outflow.

In one embodiment (FIG. 39), a heat exchanger was constructed by mounting two rectangular brass tubes together. The brass tubes were from MacMaster-Carr (8859K115), and were 5/32-inch high×5/16-inch wide×1 foot long. One tube was cut in the middle into two shorter tubes. Those two tubes were stacked together and tightly mounted with SCOTCH® tape to guarantee an excellent contact between the two tubes. Polyurethane tubes (MacMaster-Carr, 50555K64, 1/16-inch-ID, 1/8 inch-OD, 1-inch-long) were then inserted into the ends of the two brass tubes, and an epoxy structure adhesive (MacMaster-Carr, 50555K64) was smeared onto the connection area between the brass tubes and polyurethane tubes. After curing for one hour, the whole set up was tested for water sealing. Four thermocouples were then attached at the end of each tube to monitor the temperature by a thermometer (Digi sense Pro 4-Input Data Logging T/C Thermometer, Type K) which can read four data points at the same time. The whole set up was then rapped all over with thermal insulation strips (MacMaster-Carr, 4478K1) to prevent heat exchange with the ambient environment. The upper tube in FIG. 39 was then connected to a hot water source, and the lower tube in FIG. 39 was connected to a cold water source.

In the first test, only hot water was injected into the hot water tube (leaving the cold water tube empty), and the temperature of the water before and after flowing through the tube was measured as 58° C. and 54° C., respectively. In the second test, only cold water was allowed to flow through the cold water tube (no water in the hot water tube), and the temperature was measured to be 8° C. and 10° C. before and after entering the tube, respectively. In the third test, hot water and cold water were both allowed to flow through the tubes simultaneously, and the temperature at the distal end was measured. With beginning temperatures of 58° C. for hot water and 8° C. for cold water, the water temperature from each tube both became 40° C. after flowing through the SGM structure. The flow rate was 3 mL/s for all of the above tests.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

We claim:

1. A multilayer structure comprising two or more solid layers, wherein each solid layer is separated from an adjacent solid layer by a gap, such that the multilayer structure comprises an alternating pattern of solid layers and gaps, and wherein the two or more solid layers are pre-stressed,
   wherein the solid layers are electrified, magnetized, or electrified and magnetized; wherein electrified layers are electrified via corona charging, thermal charging, space charging, grafting of charged components, adsorption of charged components, absorption of charged components, blending of charged components, mixing of charged components, embedding of charged components, heat charging, glow discharging, plasma treating, or combinations thereof; and wherein magnetized layers are magnetized via embedding, grafting, blending, mixing, attaching, adhering, adsorption, or absorption of magnetized components, or combinations thereof;
   wherein the electrified layers have a non-uniform electric field distribution or a non-uniform magnetic field distribution along a surface of a layer in a planar direction, along a thickness of a layer in a transverse direction, or both; wherein the non-uniform electric field distribution or the non-uniform magnetic field distribution comprises dotted, stripped, curved, straight, circular, star-shaped, mesh-like, oval, rectangle, square, hexagonal, or irregular shapes, or combinations thereof.

2. The multilayer structure of claim 1, wherein at least one of the two or more solid layers is pre-stressed to a different magnitude than an adjacent solid layer.

3. The multilayer structure of claim 1, wherein at least one of the two or more solid layers is pre-stressed in a different direction than an adjacent solid layer.

4. The multilayer structure of claim 1, wherein the multilayer structure is adapted to receive an amount of gas such that an inner pressure within one or more of the gaps is adjustable, or the thickness of one or more of the gaps is adjustable.

5. The multilayer structure of claim 1, further comprising one or more discontinuous components within one or more of the gaps, wherein the discontinuous components provide support for the two or more solid layers, and wherein the one or more discontinuous components comprise a fiber, a tube, a pillar, a particle, a block, a tape, a band, a fiber bundle, a particle cluster, a pillar array, or a combination thereof.

6. The multilayer structure of claim 5, wherein the one or more discontinuous components within a gap have a total area that is less than 10%, less than 1%, less than 0.1%, or less than 0.01% of the area of a solid layer defining a side of the gap.

7. The multilayer structure of claim 1, wherein the two or more solid layers comprise a metal, a metal alloy, a polymer, an elastomer, a carbon material, a ceramic, glass, a composite material, or a combination or components thereof.

8. The multilayer structure of claim 1, wherein one or both sides of the two or more solid layers are covered by a magnetically neutral layer, an electrically neutral layer, or a partly neutral layer.

9. The multilayer structure of claim 8, wherein the neutral or partly neutral layers are uniform, heterogeneous, anisotropic, or a combination thereof.

10. The multilayer structure of claim 1, wherein each of the thicknesses of the two or more solid layers and the at least one gap are 1 µm or less.

11. The multilayer structure of claim 1, wherein the multilayer structure is adapted for thermal insulation, acoustic insulation, thermal management, acoustic management, or combinations thereof.

12. The multilayer structure of claim 1, wherein the solid layers comprise a low-emissivity material.

13. The multilayer structure of claim 12, wherein the low-emissivity material comprises one or more polymers, ceramics, elastomers, glasses, semiconductors, or conductors.

14. The multilayer structure of claim 13, wherein the low-emissivity material comprises one or more of poly(ethylene terephthalate) (PET), aluminum, zinc oxide, titanium oxide, tin oxide, indium oxide, indium tin oxide, zirconium oxide, or another oxide.

* * * * *